United States Patent
Cownden et al.

(12) 
(10) Patent No.: US 6,316,134 B1
(45) Date of Patent: Nov. 13, 2001

(54) FUEL CELL ELECTRIC POWER GENERATION SYSTEM

(75) Inventors: Ryan Cownden, Calgary; Michael Eiche, Richmond; Craig Louie, North Vancouver; David S. Watkins, Coquitlam, all of (CA)

(73) Assignee: Ballard Generation Systems, Inc., Burnaby (CA)

( * ) Notice: Subject to any disclaimer, the term of this patent is extended or adjusted under 35 U.S.C. 154(b) by 0 days.

(21) Appl. No.: 09/395,299

(22) Filed: Sep. 13, 1999

(51) Int. Cl.⁷ .................................................. H01M 8/18
(52) U.S. Cl. .............................. 429/19; 429/12; 429/13; 429/17; 429/20
(58) Field of Search .................................. 429/12, 13, 17, 429/19, 20

(56) References Cited

U.S. PATENT DOCUMENTS

| | | |
|---|---|---|
| 3,972,731 | 8/1976 | Bloomfield et al. ............... 136/86 |
| 3,976,506 | 8/1976 | Landau ............................... 136/86 |
| 3,982,962 | 9/1976 | Bloomfield . | |
| 4,001,041 | 1/1977 | Menard ............................. 429/17 |
| 4,004,947 | 1/1977 | Bloomfield ...................... 429/17 |
| 4,128,700 | 12/1978 | Sederquist ....................... 429/17 |
| 4,588,659 | 5/1986 | Abens et al. ................... 429/20 |
| 4,738,903 | 4/1988 | Garow et al. ................... 429/17 |
| 4,861,347 | 8/1989 | Szydlowski et al. ............. 48/61 |
| 4,976,747 | 12/1990 | Szydlowski et al. ........... 48/127.9 |
| 4,994,331 | * 2/1991 | Cohen ............................. 429/17 |
| 5,019,356 | 5/1991 | Silberring ...................... 422/191 |
| 5,019,463 | 5/1991 | Matsubara et al. ............. 429/12 |
| 5,268,240 | 12/1993 | Miyama ........................... 429/23 |
| 5,284,717 | 2/1994 | Yamase et al. ................. 429/17 |
| 5,302,470 | 4/1994 | Okada et al. ................... 429/17 |
| 5,360,679 | * 11/1994 | Buswell et al. ................ 429/19 |
| 5,366,819 | * 11/1994 | Hartvigen et al. ............. 429/17 |
| 5,573,867 | * 11/1996 | Zafred et al. ................... 429/17 |
| 5,658,681 | 8/1997 | Sato et al. ..................... 429/13 |
| 5,769,909 | 9/1998 | Bonk et al. ................... 48/127.9 |
| 5,780,179 | 7/1998 | Okamoto ......................... 429/20 |
| 6,165,633 | * 12/2000 | Negishi ........................... 429/17 |

FOREIGN PATENT DOCUMENTS

| | | |
|---|---|---|
| 63-310703 | 12/1988 | (JP) . |
| 20-18301 | 1/1990 | (JP) . |
| 05-198309 | 8/1993 | (JP) . |
| 06-240268 | 8/1994 | (JP) . |
| 07-320761 | 12/1995 | (JP) . |
| 09-027337 | 1/1997 | (JP) . |
| 10-265201 | 10/1998 | (JP) . |
| 2000-034104 | 2/2000 | (JP) . |
| WO 92/10009 | 6/1992 | (WO) . |
| WO 00/39875 | 7/2000 | (WO) . |

* cited by examiner

Primary Examiner—Carol Chaney
Assistant Examiner—Dah-Wei D. Yuan
(74) Attorney, Agent, or Firm—McAndrews, Held & Malloy, Ltd.

(57) ABSTRACT

A fuel cell electric power generation system comprises an electric power generation subsystem, a fuel processing subsystem, an oxidant subsystem, a water circulation subsystem, and a temperature control subsystem. The improved system employs a novel arrangement of components which provides improved interaction between the subsystems while also simplifying the apparatus by integrating components to provide improved thermal and electrical efficiency. The fuel processing subsystem preferably comprises a furnace for providing heat to a plurality of components disposed within the furnace. In one embodiment, a reformer, a fuel stream humidifier, and a heat exchanger are all disposed within the furnace vessel, with the outlet of the humidifier fluidly connected to the inlet of the reformer and the outlet of the heat exchanger fluidly connected to a desulfurizer located external to the furnace. The fuel processing subsystem may further comprise a shift reactor that exchanges heat with a cathode exhaust stream directed to the shift reactor from the power generation subsystem. After passing through the shift reactor, the cathode exhaust stream is preferably directed to the furnace burner.

46 Claims, 5 Drawing Sheets

FIG. 3A

| STREAM | TEMP (DEG F) | PRESSURE (psig) | MOLAR FLOW (lbmol/h) | MASS FLOW (lb/h) | H2 (lbmol/h) | CH4 (lbmol/h) | N2 (lbmol/h) | O2 (lbmol/h) | CO (lbmol/h) | CO2 (lbmol/h) | H2O (lbmol/h) | ETHYLENE GLYCOL (lbmol/h) |
|---|---|---|---|---|---|---|---|---|---|---|---|---|
| 1 | 70 | 10.0 | 6.15 | 98.6 | 0.00 | 6.15 | 0.00 | 0.00 | 0.00 | 0.00 | 0.00 | 0.00 |
| 2 | 72 | 10.0 | 6.33 | 100.8 | 0.13 | 6.16 | 0.00 | 0.00 | 0.00 | 0.03 | 0.02 | 0.00 |
| 3 | 291 | 77.4 | 6.33 | 100.8 | 0.13 | 6.16 | 0.00 | 0.00 | 0.00 | 0.03 | 0.02 | 0.00 |
| 4 | 291 | 77.4 | 6.10 | 97.1 | 0.12 | 5.93 | 0.00 | 0.00 | 0.00 | 0.03 | 0.02 | 0.00 |
| 5 | 420 | 76.9 | 6.10 | 97.1 | 0.12 | 5.93 | 0.00 | 0.00 | 0.00 | 0.03 | 0.02 | 0.00 |
| 6 | 420 | 73.6 | 6.10 | 97.1 | 0.12 | 5.93 | 0.00 | 0.00 | 0.00 | 0.03 | 0.02 | 0.00 |
| 7 | 936 | 58.5 | 31.48 | 391.6 | 15.79 | 1.42 | 0.00 | 0.00 | 2.39 | 2.16 | 9.72 | 0.00 |
| 8 | 403 | 58.0 | 31.48 | 391.6 | 15.79 | 1.42 | 0.00 | 0.00 | 2.39 | 2.16 | 9.72 | 0.00 |
| 9 | 346 | 56.4 | 31.48 | 391.6 | 18.14 | 1.42 | 0.00 | 0.00 | 0.04 | 4.51 | 7.37 | 0.00 |
| 10 | 255 | 56.1 | 31.48 | 391.6 | 18.14 | 1.42 | 0.00 | 0.00 | 0.04 | 4.51 | 7.37 | 0.00 |
| 11 | 321 | 55.2 | 31.81 | 402.9 | 18.03 | 1.42 | 0.29 | 0.00 | 0.00 | 4.55 | 7.52 | 0.00 |
| 12 | 169 | 54.7 | 26.58 | 308.7 | 18.03 | 1.42 | 0.29 | 0.00 | 0.00 | 4.55 | 2.29 | 0.00 |
| 13 | 169 | 54.7 | 26.63 | 313.2 | 17.90 | 1.41 | 0.46 | 0.00 | 0.00 | 4.51 | 2.30 | 0.00 |
| 14 | 169 | 52.7 | 12.34 | 284.5 | 3.56 | 1.41 | 0.46 | 0.00 | 0.00 | 4.51 | 2.39 | 0.00 |
| 15 | 169 | 52.7 | 10.91 | 258.8 | 3.56 | 1.41 | 0.46 | 0.00 | 0.00 | 4.51 | 0.97 | 0.00 |
| 16 | 70 | 0.0 | 68.59 | 1970.0 | 0.00 | 0.00 | 53.55 | 14.19 | 0.00 | 0.02 | 0.83 | 0.00 |
| 17 | 185 | 57.7 | 74.68 | 2074.3 | 0.00 | 0.00 | 53.15 | 14.09 | 0.00 | 0.02 | 7.43 | 0.00 |
| 18 | 185 | 57.7 | 71.40 | 1983.2 | 0.00 | 0.00 | 50.81 | 13.47 | 0.00 | 0.02 | 7.11 | 0.00 |
| 19 | 167 | 56.7 | 69.97 | 1957.2 | 0.00 | 0.00 | 50.80 | 13.47 | 0.00 | 0.02 | 5.68 | 0.00 |
| 20 | 178 | 53.7 | 64.04 | 1750.8 | 0.00 | 0.00 | 50.80 | 6.34 | 0.00 | 0.02 | 6.87 | 0.00 |
| 21 | 165 | 53.4 | 64.04 | 1750.8 | 0.00 | 0.00 | 50.80 | 6.34 | 0.00 | 0.02 | 6.87 | 0.00 |
| 22 | 165 | 53.4 | 62.19 | 1717.5 | 0.00 | 0.00 | 50.80 | 6.34 | 0.00 | 0.02 | 5.02 | 0.00 |
| 23 | 241 | 53.1 | 62.19 | 1717.5 | 0.00 | 0.00 | 50.80 | 6.34 | 0.00 | 0.02 | 5.02 | 0.00 |
| 24 | 366 | 53.0 | 62.19 | 1717.5 | 0.00 | 0.00 | 50.80 | 6.34 | 0.00 | 0.02 | 5.02 | 0.00 |
| 25 | 661 | 52.7 | 62.19 | 1717.5 | 0.00 | 0.00 | 50.80 | 6.34 | 0.00 | 0.02 | 5.02 | 0.00 |
| 26 | 603 | 49.7 | 71.32 | 1976.3 | 0.00 | 0.00 | 51.27 | 1.74 | 0.00 | 5.94 | 12.37 | 0.00 |
| 27 | 711 | 49.7 | 74.18 | 2053.0 | 0.00 | 0.00 | 53.14 | 1.79 | 0.00 | 6.17 | 13.09 | 0.00 |
| 28 | 394 | 0.3 | 74.18 | 2053.0 | 0.00 | 0.00 | 53.14 | 1.79 | 0.00 | 6.17 | 13.09 | 0.00 |
| 29 | 334 | 0.0 | 74.18 | 2053.0 | 0.00 | 0.00 | 53.14 | 1.79 | 0.00 | 6.17 | 13.09 | 0.00 |
| 30 | 185 | 57.7 | 2.63 | 73.0 | 0.00 | 0.00 | 1.87 | 0.50 | 0.00 | 0.00 | 0.26 | 0.00 |
| 31 | 185 | 57.7 | 0.41 | 11.4 | 0.00 | 0.00 | 0.29 | 0.08 | 0.00 | 0.00 | 0.04 | 0.00 |
| 32 | 185 | 57.7 | 0.24 | 6.7 | 0.00 | 0.00 | 0.17 | 0.05 | 0.00 | 0.00 | 0.02 | 0.00 |
| 33 | 291 | 77.4 | 0.23 | 3.7 | 0.00 | 0.22 | 0.00 | 0.00 | 0.00 | 0.00 | 0.00 | 0.00 |
| 34 | 169 | 54.7 | 0.19 | 2.2 | 0.13 | 0.01 | 0.00 | 0.00 | 0.00 | 0.03 | 0.02 | 0.00 |
| 35 | 175 | 74.1 | 16.33 | 294.3 | 0.00 | 0.00 | 0.00 | 0.00 | 0.00 | 0.00 | 16.33 | 0.00 |
| 36 | 248 | 73.6 | 16.33 | 294.3 | 0.00 | 0.00 | 0.00 | 0.00 | 0.00 | 0.00 | 16.33 | 0.00 |
| 37 | 175 | 59.2 | 241.32 | 4347.5 | 0.00 | 0.00 | 0.00 | 0.00 | 0.00 | 0.00 | 241.3 | 0.00 |
| 38 | 167 | 58.7 | 241.32 | 4347.5 | 0.00 | 0.00 | 0.00 | 0.00 | 0.00 | 0.00 | 241.3 | 0.00 |
| 39 | 175 | 56.7 | 242.76 | 4347.5 | 0.00 | 0.00 | 0.01 | 0.00 | 0.00 | 0.00 | 242.8 | 0.00 |
| 40 | 166 | 51.7 | 3286.00 | 91762.0 | 0.00 | 0.00 | 0.00 | 0.00 | 0.00 | 0.00 | 2547 | 739.2 |
| 41 | 166 | 72.2 | 3286.00 | 91762.0 | 0.00 | 0.00 | 0.00 | 0.00 | 0.00 | 0.00 | 2547 | 739.2 |
| 42 | 167 | 71.7 | 2908.97 | 81233.5 | 0.00 | 0.00 | 0.00 | 0.00 | 0.00 | 0.00 | 2255 | 654.4 |
| 43 | 166 | 72.2 | 377.03 | 10528.5 | 0.00 | 0.00 | 0.00 | 0.00 | 0.00 | 0.00 | 292.2 | 84.8 |
| 44 | 170 | 71.7 | 377.03 | 10528.5 | 0.00 | 0.00 | 0.00 | 0.00 | 0.00 | 0.00 | 292.2 | 84.8 |
| 45 | 168 | 71.7 | 3286.00 | 91762.0 | 0.00 | 0.00 | 0.00 | 0.00 | 0.00 | 0.00 | 2547 | 739.2 |
| 46 | 178 | 56.7 | 3286.00 | 91762.0 | 0.00 | 0.00 | 0.00 | 0.00 | 0.00 | 0.00 | 2547 | 739.2 |

FIG. 3B

| STREAM | TEMPERATURE RANGE (DEGREES F) | PRESSURE RANGE (psig) |
|---|---|---|
| 1 | 30 to 100 | 0 to 200 |
| 2 | 30 to 105 | 0 to 200 |
| 3 | 150 to 450 | 10 to 450 |
| 4 | 150 to 450 | 10 to 450 |
| 5 | 350 to 700 | 10 to 450 |
| 6 | 350 to 700 | 10 to 450 |
| 7 | 600 to 1250 | 10 to 450 |
| 8 | 300 to 850 | 10 to 450 |
| 9 | 250 to 450 | 10 to 450 |
| 10 | 170 to 350 | 10 to 450 |
| 11 | 225 to 425 | 10 to 450 |
| 12 | 130 to 210 | 10 to 450 |
| 13 | 130 to 210 | 10 to 450 |
| 14 | 130 to 210 | 10 to 450 |
| 15 | 130 to 210 | 10 to 450 |
| 16 | -40 to 110 | 0 |
| 17 | 100 to 450 | 10 to 400 |
| 18 | 100 to 450 | 10 to 400 |
| 19 | 125 to 210 | 10 to 400 |
| 20 | 130 to 210 | 10 to 400 |
| 21 | 100 to 210 | 10 to 400 |
| 22 | 100 to 210 | 10 to 400 |
| 23 | 200 to 400 | 10 to 400 |
| 24 | 300 to 800 | 10 to 400 |
| 25 | 550 to 1000 | 10 to 400 |
| 26 | 400 to 900 | 10 to 400 |
| 27 | 500 to 1000 | 10 to 400 |
| 28 | 300 to 600 | 0 to 5 |
| 29 | 200 to 500 | 0 to 5 |
| 30 | 100 to 450 | 10 to 400 |
| 31 | 100 to 450 | 10 to 400 |
| 32 | 100 to 450 | 10 to 400 |
| 33 | 150 to 450 | 10 to 450 |
| 34 | 130 to 210 | 10 to 450 |
| 35 | 120 to 210 | 10 to 500 |
| 36 | 120 to 450 | 10 to 500 |
| 37 | 120 to 210 | 10 to 500 |
| 38 | 125 to 210 | 10 to 500 |
| 39 | 120 to 210 | 10 to 400 |
| 40 | 130 to 210 | 0 to 500 |
| 41 | 130 to 210 | 0 to 500 |
| 42 | 130 to 210 | 0 to 500 |
| 43 | 130 to 210 | 0 to 500 |
| 44 | 130 to 210 | 0 to 500 |
| 45 | 130 to 210 | 0 to 500 |
| 46 | 130 to 210 | 0 to 500 |

FUEL CELL ELECTRIC POWER GENERATION SYSTEM

FIELD OF THE INVENTION

The present invention relates generally to a hydrocarbon fueled solid polymer fuel cell system for producing electric power. More specifically, the present invention relates to a pressurized fuel cell electric power generation system that converts fuel and oxidant fluid streams into electrical energy and reaction products in a solid polymer fuel cell stack.

BACKGROUND OF THE INVENTION

Electrochemical fuel cell electric power generation systems convert fuel fluid streams, such as natural gas or propane, and oxidant fluid streams, such as oxygen or air, into respective intermediate products, such as a hydrogen-rich fuel stream and a humidified oxidant stream, which a fuel cell ultimately converts into electric power, heat, and reaction products, such as water and carbon dioxide. Fuel cell power plants are of particular interest to utilities because they can provide distributed or remote sources of electricity, thus overcoming some of the difficulties associated with conventional nuclear, coal or hydrocarbon fuel power plants, such as access to high voltage transmission lines, distribution to urban power stations, and the substantial financial commitments typically associated with installation of conventional power plants. In addition, fuel cell power generation systems are capable of operating at greater than 40% electrical efficiency, which is more efficient than combustion-based electric power plants. Fuel cell power generation systems are thus able to use readily available fuels to provide electrical power close to the point of use, quietly, with minimal emissions, and with high overall efficiency.

A hydrocarbon fueled solid polymer fuel cell electric power generation system is the subject of commonly-owned U.S. Pat. No. 5,360,679 issued Nov. 12, 1994 ("the '679 patent") which is hereby incorporated by reference in its entirety. The '679 patent describes a fuel cell generation system that comprises:

(1) an electric power generation subsystem for producing electricity, heat, and water from a hydrogen-containing fuel stream and an oxidant stream;

(2) a fuel processing subsystem for producing a hydrogen-rich fuel for the electric power generation subsystem;

(3) an oxidant subsystem for delivering pressurized oxidant to the electric power generation subsystem;

(4) a water recovery subsystem for recovering the water produced in the electric power generation subsystem and optionally for cooling the electric power generation subsystem;

(5) a power conversion subsystem for converting the electricity produced into utility grade electricity; and (6) a control subsystem for monitoring and controlling the supply of fuel and oxidant streams to the electric power generation subsystem.

The subsystems of the '679 patent are described with reference to FIG. 1, which is a schematic flow diagram of a preferred embodiment of a fuel cell power generation system disclosed in the '679 patent. The electric power generation subsystem comprises fuel cell stack 100. Fuel cell stack 100 preferably comprises a plurality of solid polymer fuel cell assemblies. Each fuel cell assembly comprises a membrane electrode assembly interposed between two separator plates.

The membrane electrode assembly typically employs an ion exchange membrane interposed between two porous, electrically conductive electrodes and a catalyst disposed at the interface between the membrane and the respective electrodes. The separator plates may comprise fluid channels for providing a flow field pattern for directing reactants to the membrane electrode assembly.

In the system illustrated in FIG. 1, the fuel processing subsystem comprises compressor 102, pre-oxidizer cooler 104, pre-oxidizer 106, hydrodesulfurizer 108, hydrogenator 110, evaporator 112, regenerator heat exchanger 114, furnace 116 (comprising a reformer), shift reactor precooler 118, shift reactor first stage 120, intercooler 122, shift reactor second stage 124, hydrogen recycle compressor 126, selective oxidizer pre-cooler 128, selective oxidizer 130, fuel filter 132, anode pre-cooler 134, and water separator 136.

The raw inlet fuel stream is directed to the fuel processing subsystem via compressor 102. Most of the raw inlet fuel stream is directed to downstream fuel processing components. A small portion of the raw inlet fuel stream is directed to auxiliary burner 138.

The raw inlet fuel stream is first directed through preoxidizer cooler 104 and preoxidizer 106. In preoxidizer 106, oxygen from peak shave gas is consumed. Peak shave gas is a mixture of air and propane that is occasionally added to natural gas during peak demand periods. Preoxidizer 106 is not required if the raw inlet fuel stream does not comprise any oxygen, for example, as in the case where peak shave gas is not employed and the raw inlet fuel stream is propane or natural gas.

Next, sulfur is removed from the inlet fuel stream. A desulfurizer such as hydrodesulfurizer 108 may be employed to accomplish this step. The inlet fuel stream that passes through hydrodesulfurizer 108 contacts a catalyst that causes the sulfur to react with hydrogen to form hydrogen sulfide. Hydrogen needed for this reaction is provided by hydrogen recycle compressor 126 which directs a portion of the processed (reformate) hydrogen-rich fuel stream back into the raw inlet fuel stream upstream of hydrodesulfurizer 108. Inside hydrodesulfurizer 108, after contacting the catalyst, the fuel stream then passes over a bed of zinc oxide and the hydrogen sulfide reacts to form solid zinc sulfide and water.

Upon exiting hydrodesulfurizer 108, the desulfurized fuel stream, which still contains some residual hydrogen, is directed to hydrogenator 110 in which it passes through a bed of hydrogenation catalyst that induces the hydrogen to react with unsaturated hydrocarbons (for example, olefins) to produce saturated hydrocarbons.

The fuel stream exiting hydrogenator 110 is then directed to evaporator 112 where the fuel stream is humidified by mixing it with a fine spray of water. For example, evaporator 112 may be a co-current flow vaporizer having a low pressure drop design. The humidified fuel stream exits evaporator 112 at about 350–360° F. (177–182° C.), so the water entrained therein is substantially vaporized. The heat for evaporator 112 is supplied by the burner exhaust stream, which originates from reformer furnace 116.

The humidified fuel stream exiting evaporator 112 is then directed through regenerator heat exchanger 114. In regenerator heat exchanger 114 heat is exchanged between the hot reformate fuel stream exiting furnace 116 and the humidified fuel stream which is being directed toward the reformer in furnace 116. The temperature of the humidified fuel stream leaving regenerator heat exchanger 114 is approximately 650° F. (343° C.).

The humidified and heated fuel stream is then directed to the reformer that is located within furnace 116. A catalyst is provided inside the reformer to induce the desired endothermic chemical reactions that convert the humidified fuel stream into a reformate fuel stream. Furnace burner 140 provides the heat that is required to maintain the desired endothermic reaction. The reformate fuel stream also comprises carbon dioxide, carbon monoxide, and water vapor. The reformate fuel stream leaves reformer furnace 116 with a temperature of approximately 850° F. (454° C.).

As mentioned above, after exiting reformer furnace 116, the reformate fuel stream is directed to regenerator heat exchanger 114 (where the heat from the reformate fuel stream is used to preheat the humidified fuel stream upstream of the reformer). The reformate fuel stream leaving regenerator heat exchanger 114 has a temperature of approximately 580° F. (304° C.). The reformate fuel stream is further cooled in shift reactor precooler 118 where heat is transferred to an oxidant stream before it is fed to furnace burner 140.

The reformate fuel stream exiting shift reactor precooler 118 is then directed to the first stage 120 of a two-stage shift reactor in which a catalyst (preferably a copper-containing composition) exothermically converts the carbon monoxide in the reformate fuel stream into carbon dioxide and hydrogen.

Feedwater preheater 122 acts as a shift reactor intercooler to bring the temperature of the reformate fuel stream exiting first stage 120 of the two-stage shift reactor to approximately 380° F. (193° C.). The reformate fuel stream exiting feedwater preheater 122 is then directed to second stage 124 of the two-stage shift reactor, in which another catalyst is preferably employed to convert carbon monoxide remaining in the reformate fuel stream into carbon dioxide and hydrogen. A small amount of the reformate fuel stream is taken from downstream of second stage 124 and is directed to hydrogen recycle compressor 126 for delivery into the inlet fuel stream upstream of hydrodesulfurizer 108. The remainder of the reformate fuel stream exiting second stage 124 of the two-stage shift reactor is directed through selective oxidizer precooler 128, which cools the reformate fuel stream to approximately 280° F. (138° C.), and is then directed through selective oxidizer 130.

In selective oxidizer 130, the reformate fuel stream is mixed with oxygen to convert substantially all of the remaining carbon monoxide in the reformate fuel stream into carbon dioxide, thus producing a hydrogen-rich fuel stream. Fuel filter 132 removes entrained catalyst particles from the reformate fuel stream exiting selective oxidizer 130. The hydrogen-rich fuel stream exiting filter 132 is then directed to anode precooler 134 which cools the fuel stream to substantially the same temperature as fuel cell stack 100 by spraying water into the fuel stream from the water recovery subsystem.

Before the hydrogen-rich fuel stream is fed into fuel cell stack 100, excess liquid water is separated from the gaseous hydrogen-rich fuel stream in water separator 136. The water exiting water separator 136 is directed to water tank 142. The hydrogen-rich fuel stream exiting water separator 136 is then introduced into the anodes of fuel cell stack 100.

The oxidant subsystem delivers pressurized oxidant to the electric power generation subsystem. Oxidant enters the oxidant subsystem through a conduit and passes through filter 144 to remove particulates. The filtered oxidant stream enters first stage 146 of a two-stage turbocompressor to produce a pressurized oxidant stream having a pressure of approximately 20 psig (138 kPa). The bearing oil associated with first stage 146 of the staged turbocompressor is cooled by circulating the oil through turbocompressor bearing oil cooler 148. The increased pressure of the oxidant stream exiting first stage 146 causes its temperature to rise to approximately 250° F. (121° C.). The pressurized oxidant stream passes through compressor intercooler 150 which cools the oxidant stream to approximately 140° F. (60° C.) for more efficient compression in second stage 152. The pressure of the oxidant stream exiting second stage 152 is approximately 65 psig (448 kPa), and the temperature is approximately 340° F. (171° C.).

A small amount of the pressurized oxidant stream exiting second stage 152 is diverted to auxiliary burner 138 when needed to provide auxiliary energy to drive the turbine portion of the two-stage turbocompressor. The remainder of the pressurized oxidant stream exiting second stage 152 is directed to cathode precooler 154. The oxidant stream exiting cathode precooler 154 has a temperature of approximately 210° F. (99° C.). A small amount of the pressurized, cooled oxidant stream exiting cathode precooler 154 is directed to selective oxidizer 130 where oxygen is needed to selectively oxidize the residual carbon monoxide. The remainder of the pressurized, cooled, oxidant stream is directed to oxidant humidifier 156. In oxidant humidifier 156, coolant water that has passed through the electric power generation subsystem is employed to humidify the oxidant stream. The cooled, humidified oxidant stream exiting oxidant humidifier 156 is further humidified with steam generated by selective oxidizer precooler 128. Finally, the humidified oxidant stream is passed through water trap 158 to remove any water droplets entrained in the oxidant stream. Water removed by water trap 158 is directed to water tank 142. The pressurized, humidified and heated oxidant stream is then introduced into the cathodes of fuel cell stack 100.

Portions of the water recovery subsystem have already been described as they relate to other subsystems. The water recovery subsystem recovers water by collecting excess water from the streams in other subsystems and returning the recovered water to water tank 142. In particular, water is collected from water separator 136 in the fuel processing subsystem, water trap 158 in the oxidant subsystem, water separator 160 which removes excess water from the cathode exhaust stream, water separator 162 which removes excess water from the anode exhaust stream, and water recovery heat exchanger 164 which condenses and removes water from the furnace burner exhaust stream. Feedwater pump 166 is fed from water tank 142 and first pumps recovered water through filter 168 to provide a purified water stream to the following subsystems:

(A) the electric power generation subsystem for cooling fuel cell stack 100;

(B) the fuel processing subsystem for use in the hydrocarbon reforming process and for humidifying the fuel stream fed to fuel cell stack 100; and (C) the oxidant subsystem for humidifying the oxidant stream fed to fuel cell stack 100.

The cooling loop for fuel cell stack 100 comprises a coolant accumulator 170, which acts as a reservoir for coolant thermal expansion and accepts make-up water from feedwater pump 166. Within the cooling loop, coolant pump 172 circulates the cooling water, first to fuel cell stack 100, and then to other components. In FIG. 1, the cooling water that exits fuel cell stack 100 is directed to oxidant humidifier 156. Excess water not absorbed as water vapor in oxidant humidifier 156 is recovered. A portion of the water recovered from oxidant humidifier 156 is directed to selective oxidizer 130. The water exiting from selective oxidizer 130, is combined with the remainder of the water recovered from oxidant humidifier 156, and is directed to low grade heat exchanger 174 and then to temperature control heat exchanger 176, which cools the water stream to approximately 160–170° F. (71–77° C.). The cooled water stream is then directed to coolant pump 172 for recirculation within the coolant loop.

Water directed from water tank 142 to anode precooler 134 is employed to cool the hydrogen-rich fuel stream. Water from water tank 142 is also directed to selective oxidizer precooler 128. The heat transferred from the hydrogen-rich fuel stream to the water flowing through precooler 128 converts the water into steam, which is introduced into the pressurized oxidant stream downstream of oxidant humidifier 156. Finally, water from water tank 142 is also directed to evaporator 112 via shift reactor intercooler 122 (that is, feedwater preheater), which heats the water stream to approximately 310° F. (154° C.). In evaporator 112 the heated water stream is vaporized and combined with the fuel stream for the desired steam reformation reaction.

The power generation system also comprises means for utilizing the surplus oxygen and fuel in the respective cathode and anode exhaust streams, which flow from fuel cell stack 100. The cathode and anode exhaust streams are ultimately directed to furnace burner 140 where these exhaust streams are combusted to produce heat for the reformation process. Prior to introduction to furnace burner 140, the cathode exhaust stream is preheated by being passed through cathode precooler 154, shift reactor precooler 118, and cathode exhaust stream preheater 178. In this way, the cathode exhaust stream removes heat from the oxidant subsystem, the fuel processing subsystem, and the burner exhaust stream, respectively.

The burner exhaust stream provides heat to the cathode exhaust stream in cathode exhaust stream preheater 178 and to the fuel processing subsystem in evaporator 112. After passing through evaporator 112, the burner exhaust stream still has a temperature of about 650–660° F. (343–349° C.); the burner exhaust stream is then directed to auxiliary burner 138 and then to the turbine portion of the two-stage turbocompressors 152 and 146. At full power, the burner exhaust stream produced by furnace burner 140 may provide all the energy required by the turbines to power turbocompressors 152 and 146. Auxiliary burner 138 is typically required during start-up and during conditions when it is needed to provide supplementary energy to the burner exhaust stream.

The burner exhaust stream exiting the turbine portion of turbocompressor 146 has a temperature of about 390° F. (199° C.). The burner exhaust stream exiting the turbines is then directed to high grade heat exchanger 180 where it generates steam, and then to water recovery heat exchanger 164. Inside recovery heat exchanger 164, water vapor in the burner exhaust stream is condensed and a liquid water stream is recovered and directed to water tank 142. The cooled gaseous burner exhaust stream is then expelled from the system.

FIG. 1 also schematically shows inverter 182, which is part of the power conversion subsystem. The present invention relates to improvements that do not directly involve the power conversion subsystem or the control subsystem, and accordingly, these subsystems are not discussed in any detail herein.

An object of the present invention is to provide an improved fuel cell electric power generation system with improved reliability, operability, performance, and which may be manufactured at a reduced cost, compared to previously known solid polymer fuel cell systems. These objectives are achieved, for example, by simplifying the system, reducing the number of components, integrating functions and improving component technology.

SUMMARY OF THE INVENTION

The present fuel cell electric power generation system which comprises the following subsystems:

(A) An electric power generation subsystem comprising at least one fuel cell which comprises a cathode, an anode, and an ion exchange membrane disposed therebetween. The anode has a catalyst associated therewith for producing electrons and protons from a hydrogen-rich fuel stream. The cathode has a catalyst associated therewith for promoting the reaction of oxygen with the protons and electrons to form water and heat. Preferably the electric power generation subsystem comprises a plurality of fuel cells arranged in at least one fuel cell stack.

(B) A fuel processing subsystem for generating the hydrogen-rich fuel stream. The fuel processing subsystem comprising:
  (1) a furnace;
  (2) a furnace burner which produces a hot burner gas for providing heat within the furnace;
  (3) a reformer disposed within the furnace which catalytically converts a fuel stream comprising hydrocarbons into a reformate stream that comprises hydrogen, carbon monoxide, carbon dioxide, and water vapor;
  (4) a fuel processor for processing the reformate fuel stream to reduce the concentration of carbon monoxide to produce the hydrogen-rich fuel stream; and
  (5) a fuel feed passage for directing the hydrogen-rich stream from the fuel processing subsystem to the anode.

(C) An oxidant subsystem for pressurizing an inlet oxidant stream and directing a pressurized oxidant stream to the cathode;

(D) A water circulation subsystem for circulating and recovering water within the fuel cell electric power generation system for humidification of the desulfurized fuel stream and the pressurized oxidant stream and for cooling.

(E) A temperature control subsystem for circulating a temperature control fluid for controlling the temperature within the fuel cell electric power generation system.

The present fuel cell electric power generation system comprises additional features which, when combined, provide an improved system which is more integrated, more efficient, more reliable, and less expensive to manufacture than conventional fuel cell electric power generation systems.

For example, when the inlet fuel stream contains sulfur, the fuel processing subsystem may further comprise a desulfurizer located upstream of the reformer. The performance of the desulfurizer may be improved by preheating the inlet fuel stream. A feature of the present system is that the furnace may additionally comprise at least one heat exchanging assembly disposed within the furnace for heating the inlet fuel stream. This internal heat exchanger assembly transfers heat from the hot burner gas to the inlet fuel stream. The heated inlet fuel stream is then directed from the heat exchanger assembly to the desulfurizer which is external to the furnace. After the fuel stream has passed through the desulfurizer, the desulfurized fuel stream is directed back towards the furnace where it enters the reformer.

An advantage of locating the heat exchanger assembly inside the furnace is that piping is not required to direct the hot burner gas to an external heat exchanger and a separate heat exchanger enclosure is not required. Locating the heat exchanger assembly within the furnace results in a more efficient heat transfer arrangement because there is no heat loss associated with transporting the hot burner gas from the furnace through pipes to an external heat exchanger where further heat would be lost through the heat exchanger enclosure. Another advantage of heating the inlet fuel stream using a heat exchanger assembly within the furnace is that, during start up, the furnace may be employed to heat the inlet fuel stream, which in turn, more rapidly heats the desulfurizer catalyst so that the desulfurizer catalyst quickly reaches a more efficient operating temperature. Preferably, the desulfurizer catalyst is heated to between approximately 350–700° F. (177–371° C.).

In the preferred arrangement, the hot burner gas is directed first to the reformer and then to the heat exchanger assembly. Within the furnace, the hot burner gas is fluidly isolated from the inlet fuel stream which passes through the heat exchanger assembly, the desulfurized fuel stream which is directed to the reformer, and the reformate fuel stream which exits the reformer.

When the desulfurizer is a hydrodesulfurizer, hydrogen is needed to react with the sulfur to remove it from the fuel stream. When the inlet fuel stream is, for example, natural gas, which does not normally comprise an adequate amount of gaseous hydrogen, hydrogen may be added to the inlet fuel stream upstream of the desulfurizer. In a preferred arrangement, a portion of the fuel stream is taken from downstream of the reformer and recycled into the inlet fuel stream upstream of a fuel compressor which is employed to pressurize the fuel processing subsystem. The fuel stream downstream of the reformer contains sufficient hydrogen for reacting with the sulfur in the inlet fuel stream. Preferably, the hydrogen-rich fuel stream is recycled from downstream of the fuel processor where the fuel stream has the highest concentration of hydrogen. In the preferred embodiment the hydrogen-rich fuel stream is recycled from the pressurized hydrogen-rich fuel stream back into the inlet fuel stream, upstream of the fuel compressor so there is no need for an additional recycle compressor.

In the preferred embodiment, the fuel processor comprises a shift reactor for reducing the concentration of carbon monoxide in the reformate fuel stream. The shift reactor receives the reformate fuel stream downstream of the reformer and reacts carbon monoxide with water to produce carbon dioxide and hydrogen.

Another preferred feature of the improved system comprises a heat exchanger assembly that is integral with the shift reactor for exchanging heat between the cathode exhaust stream and the shift reactor. The shift reactor typically operates most efficiently when the fuel stream temperature measured at the shift reactor inlet is between 300–850° F. (177–454° C.). In the preferred embodiment, the cathode exhaust stream may advantageously be employed to cool or heat the shift reactor, as required, to maintain the temperature within the desired range. During normal operation, the reformate fuel stream exiting the reformer has a temperature of about 936° F. (502° C.). The temperature of the cathode exhaust stream exiting the fuel cell stack during normal operation is about 178° F. (81° C.), (that is, much less than the temperature of the reformate fuel stream which is directed to the shift reactor). Accordingly, during normal operation, the cathode exhaust stream may be employed to provide cooling to the shift reactor.

However, during start up, initially the shift reactor may be cooler than the desired temperature range, and the cathode exhaust stream may be employed to heat the shift reactor. When additional heat is required for heating the shift reactor, the cathode exhaust stream may be heated prior to being directed to the shift reactor by receiving additional heat from the turbine exhaust stream. Some or all of the cathode exhaust stream may be directed through a heat exchanger for transferring heat from the turbocompressor turbine exhaust stream. The portion of the cathode exhaust stream that is diverted through the heat exchanger may be determined with reference to the temperature of the shift reactor and how much heating or cooling is desired.

During normal operation, it is possible for the cathode exhaust stream to receive heat from the turbocompressor turbine exhaust stream and the shift reactor while also maintaining the temperature of the shift reactor within the desired range. Employing the cathode exhaust stream to cool the shift reactor is particularly advantageous because heating the cathode exhaust stream before it is directed to the furnace burner increases the temperature of the hot burner gas. Therefore, this arrangement results in higher overall electrical efficiency because the furnace burner may then provide more heat to the furnace while consuming less fuel. Using the cathode exhaust stream to heat the shift reactor during start up is advantageous because it allows the shift reactor to be heated contemporaneously with the reformer. This simplifies the start up sequence and reduces the time required for start up.

In a preferred embodiment, the fuel processor further comprises a selective oxidizer for receiving the reformate fuel stream downstream of the shift reactor and reacting the residual carbon monoxide in the reformate fuel stream with oxygen to produce carbon dioxide.

In a preferred embodiment the furnace further comprises a fuel stream humidifier disposed therein. The fuel stream humidifier uses heat from the hot burner gas to vaporize and heat a mixture comprising the desulfurized fuel stream, steam, and water, before the mixture is directed towards the reformer. In a preferred arrangement, the fuel stream humidifier comprises a tubular coil which is helical in shape. During operation, the mixture of desulfurized fuel, steam and water is directed through the tubular coil which may be disposed around a substantially cylindrical reformer vessel (also disposed within the furnace). In a preferred method, the mixture in the fuel stream humidifier is superheated, thereby vaporizing the water and providing heat for the desired endothermic reactions in the reformer.

Similarly, the heat exchanger assembly for preheating the inlet fuel stream upstream of the desulfurizer may also comprise a helical tubular coil which is disposed around a reformer vessel within the furnace.

In another preferred embodiment, the temperature control subsystem is fluidly isolated from the water circulation subsystem. A preferred water circulation subsystem comprises:

(1) a water reservoir for collecting recycled water and receiving make-up water;
(2) a feedwater pump fed for pumping a first portion of circulation water from the water reservoir to a fuel stream humidifier and a second portion of the circulation water to an oxidant stream humidifier;

(3) a first water recovery apparatus for recovering water from the oxidant stream humidifier;

(4) a second water recovery apparatus for recovering water from at least one of the cathode exhaust stream and an anode exhaust stream; and the temperature control subsystem comprises:

(1) a pump for circulating a temperature control fluid through the temperature control subsystem which comprises fluid passages within the electric power generation subsystem;

(2) an indirect heat exchanger for exchanging heat between the temperature control fluid and the second portion of the circulation water; and (3) a temperature control subsystem heat exchanger for dissipating excess heat from the temperature control subsystem.

When the temperature control subsystem is fluidly isolated from the water circulation subsystem, a temperature control fluid other than water may be employed, since fluidly isolated temperature control fluid does not mix with the water that is employed for humidification. For example, a temperature control fluid may be selected that has a lower freezing point than water, so the system may be located in places where it might be exposed to temperatures colder than the freezing temperature of water. For such conditions, the temperature control fluid may be selected from the group consisting of mixtures comprising water and ethylene glycol, mixtures comprising water and propylene glycol, perfluorocarbon compounds, and electrically non-conductive oils.

The furnace described in relation to the improved system, may by itself be employed in other fuel cell electric power generation systems for improving thermal efficiency. A preferred embodiment of the furnace comprises:

(1) a furnace vessel;

(2) a furnace burner comprising a burner head disposed within the furnace vessel for producing a hot burner gas which is circulated within the furnace vessel for providing heat within the furnace vessel;

(3) a reformer disposed within the furnace vessel for endothermically catalytically converting a fuel stream into a reformate fuel stream, which comprises, in addition to hydrogen, carbon monoxide, carbon dioxide, and water vapor, the reformer comprising:
(a) a reformer vessel;
(b) a reformer inlet for directing the fuel stream into the reformer vessel;
(c) a catalyst bed contained within the reformer vessel and in thermal contact with an exterior surface of the reformer vessel;
(d) a fluid passage for directing the fuel stream from the reformer inlet to the catalyst bed where the fuel stream is converted into a reformate fuel stream;

(4) a fluid passage for directing the reformate fuel stream to a reformer outlet through which the reformate stream exits the reformer vessel;

(5) an indirect heat exchanger assembly comprising a pipe with a heat exchanging portion disposed within the furnace vessel for heating a fluid directed through the interior of the pipe, wherein the fluid is directed to the heat exchanging portion from outside the furnace vessel and exits the heat exchanging portion and the furnace vessel through an outlet fluid conduit; and (6) burner gas fluid passages within the furnace for fluidly isolating the hot burner gas from the fuel stream, the reformate fuel stream, and the fluid flowing through the heat exchanger assembly, wherein the burner gas fluid passages direct the hot burner gas into thermal contact with exterior surfaces of the reformer vessel and the indirect heat exchanger assembly for transferring heat from the hot burner gas to the catalyst bed and the fuel stream within the reformer vessel, and to the fluid flowing through the indirect heat exchanger assembly.

Whereas previously known furnaces provide heat to upstream or downstream processes by directing a burner exhaust gas to external heat exchangers, the present preferred furnace locates the heat exchanger assemblies within the furnace vessel. As described above, this arrangement provides improved thermal efficiency, reduces the number of components, and external piping, thereby reducing manufacturing costs and increasing reliability.

The furnace vessel comprises a substantially cylindrical body with substantially hemispherical ends. The reformer vessel located inside the furnace also preferably comprises a substantially cylindrical body. The heat exchanging portion of the indirect heat exchanger assembly preferably comprises a pipe coiled around the reformer vessel body. For improving heat transfer, in one embodiment, the heat exchanging portion of the indirect heat exchanger assembly may further comprise fins extending from the pipe.

When the fuel stream humidifier is located within the furnace, the humidified fuel stream may be directed to the reformer, which is also located within the furnace, without exiting the furnace. In this preferred embodiment, the reformer inlet is located within the furnace vessel and is fluidly connected to the outlet of the fuel stream humidifier. The fuel stream thus enters the furnace through a fluid conduit and passes through the fuel stream humidifier and the reformer before exiting the furnace.

Those skilled in the art will understand that a greater improvement may be achieved if several of the above described features are combined in a single system. However, those skilled in the art will also recognize that improvements are also possible by adopting only certain features or combinations of features disclosed herein.

Further, the apparatus of the present system may be employed to implement a preferred method of operating a fuel cell electric power generation system, which comprises the following steps:

(a) operating an electric power generation subsystem comprising at least one solid polymer fuel cell to electrochemically convert a hydrogen-rich fuel stream and an oxidant stream into reaction products and an electric current;

(b) processing a fuel stream to generate the hydrogen-rich fuel stream, and supplying the hydrogen-rich fuel stream to the electric power generation subsystem, wherein processing the fuel stream comprises:

(c) catalytically reforming the fuel stream to produce a reformate fuel stream using a catalyst and heat from a furnace to promote an endothermic reforming reaction which generates the reformate fuel stream which comprises, in addition to hydrogen, carbon monoxide, carbon dioxide, and water vapor; and (d) directing the reformate fuel stream through a shift reactor to reduce the amount of carbon monoxide in the reformate fuel stream by reacting carbon monoxide with water in the reformate fuel stream to produce carbon dioxide and hydrogen;

(e) supplying a pressurized oxidant to the cathode using an oxidant compressor to pressurize an inlet oxidant stream; and (f) directing a cathode exhaust stream from the cathode to the shift reactor for indirectly exchanging heat between the fuel stream and the cathode exhaust stream by passing the cathode exhaust stream through at least one thermally conductive fluid passage within the shift reactor.

This method may further comprise heating the cathode exhaust stream upstream of the shift reactor. In particular, the cathode exhaust stream may be heated by transferring heat from a hot exhaust stream from the furnace (via the turbine of the turbocompressor). Additional advantages are achieved by later directing the heated cathode exhaust stream to the furnace burner. The preferred method further comprises directing an anode exhaust stream from the fuel cell anode to the burner for providing fuel to the burner.

When the inlet fuel stream comprises sulfur, the preferred method further comprises desulfurizing the fuel stream by heating the fuel stream and passing the heated fuel stream through a desulfurizer. This preferred method further comprises preheating the inlet fuel stream by passing the fuel stream through a heat exchanger assembly disposed within the furnace.

When the desulfurizer is a hydrodesulfurizer, it requires hydrogen to remove the sulfur from the inlet fuel stream. In this case, the method further preferably comprises recycling a portion of the hydrogen-rich fuel stream into the inlet fuel stream upstream of the fuel compressor that is employed for pressurizing the fuel stream.

BRIEF DESCRIPTION OF THE DRAWINGS

The advantages, nature and additional features of the invention will become more apparent from the following description, together with the accompanying drawings, in which:

FIG. 3A is a table that sets out certain preferred values for properties of the numbered fluid streams of FIG. 2 when the system of FIG. 2 is operating in a preferred steady-state operating mode;

FIG. 3B is a table that sets out ranges for certain properties of the numbered fluid streams in FIG. 2, representing the preferred range for these properties over the operating cycle of a system, including start-up modes and transient conditions during peak, low, and stand-by power output modes. The table in FIG. 2B also shows that the system of FIG. 2 may be operated within a range of conditions other than the preferred "nominal" temperatures and pressures which are set out in the table of FIG. 3A for a particular preferred embodiment.

DETAILED DESCRIPTION OF PREFERRED EMBODIMENTS

Figure 2:
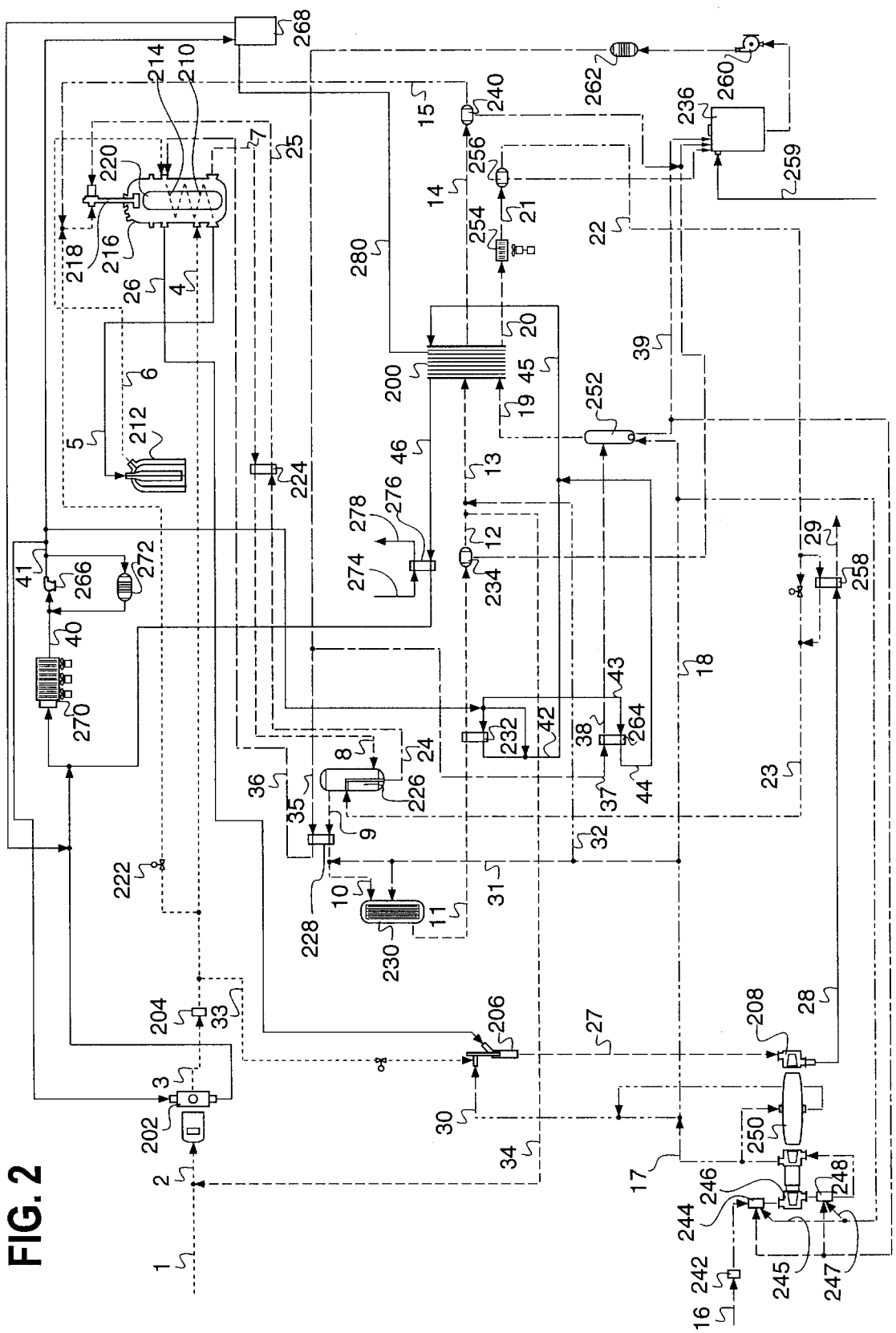
FIG. 2 is a schematic diagram of a preferred embodiment of an improved solid polymer fuel cell electric power generation system.
Figure 4:
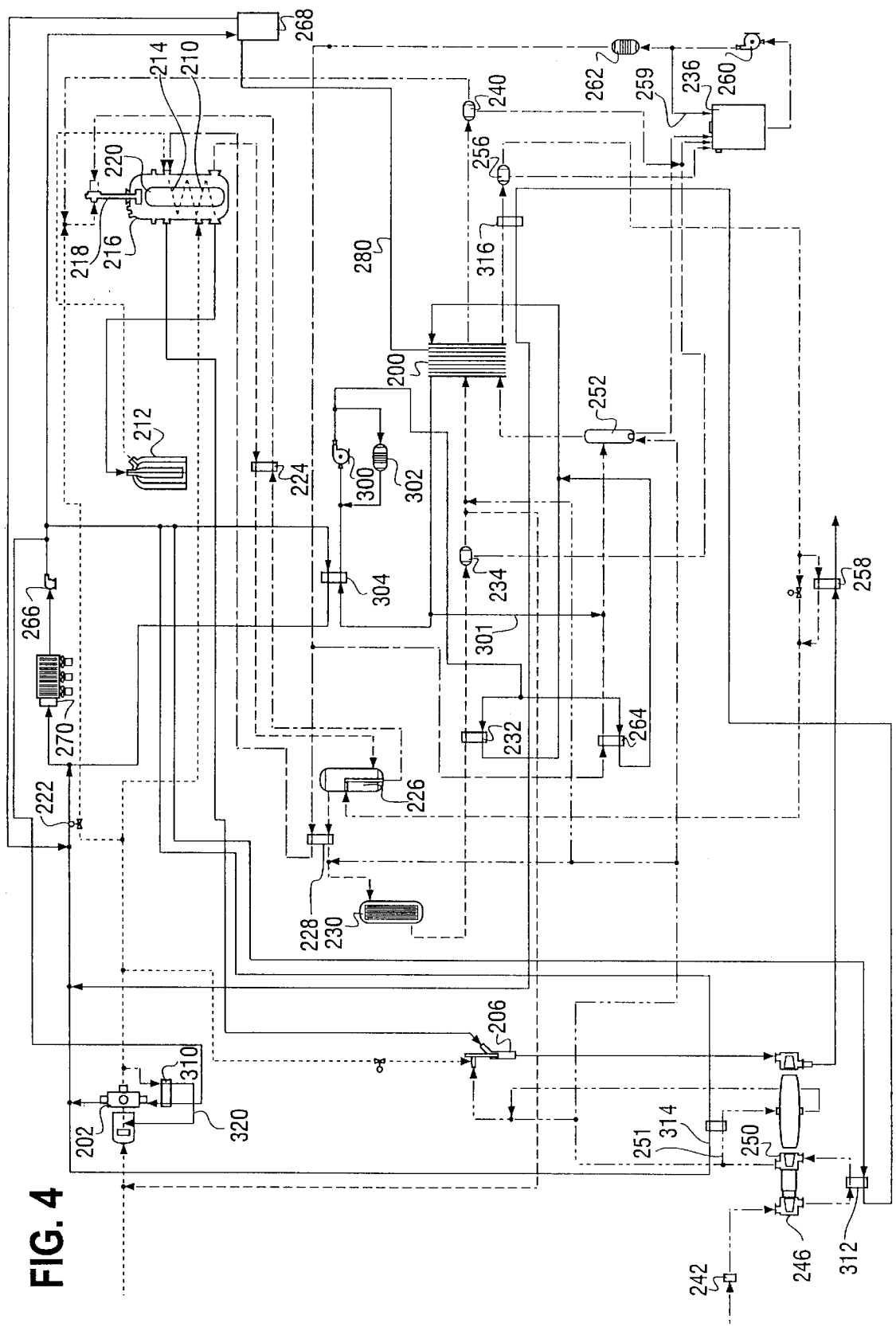
FIG. 4 is a schematic flow diagram of another preferred embodiment of an improved solid polymer fuel cell electric power generation system with an integrated water circulation and cooling subsystem according to the present invention.

FIGS. 2 and 4 are schematic diagrams that illustrate in detail preferred embodiments of an improved fuel cell electric power generation system for producing utility grade electrical power. The embodiments depicted in FIGS. 2 and 4 comprise the following subsystems that are each discussed in detail below:

(A) electric power generation subsystem, comprising fuel cell stack 200;

(B) a fuel processing subsystem;

(C) an oxidant subsystem;

(D) a water circulation subsystem; and (E) a temperature control subsystem.

In the embodiment of the system illustrated by FIG. 2, there is one primary temperature control subsystem that may employ a temperature control fluid other than water. In the embodiment of the system illustrated by FIG. 4, the temperature control subsystem is divided into a fuel cell stack temperature control loop and a freeze-tolerant temperature control loop, wherein the two loops are fluidly isolated from one another and may employ different temperature control fluids. In general, the improvements of the present fuel cell electric power generation system relate to the interaction and relative configurations between the fuel processing subsystem, the oxidant subsystem, the water circulation subsystem, the temperature control subsystem, integration and a reduced number of components. These improvements result in increased electrical and thermal efficiencies, and improved reliability, and lower cost.

In the description of the embodiment of the fuel cell electric power generation system of FIG. 2 references are made to fluid streams 1 through 46 which are directed through corresponding passages and conduits. Certain desirable values for properties for these streams such as temperature, pressure and composition are set out in the table of FIG. 3A. FIG. 3A sets out, for example, nominal temperatures and pressures which correspond to the preferred temperature and pressure of the respective streams for a 250 kW fuel cell electric power generation system when the system is operating in a preferred steady-state mode. For a fuel cell electric power generation system with a higher output, higher nominal fluid pressures may be desirable, and for systems with a lower electrical output, lower nominal fluid pressures may be employed. The nominal fluid stream temperatures for a solid polymer fuel cell electric power generation system are preferably substantially the same as the nominal temperatures set out in the table of FIG. 3A, regardless of the power output. FIG. 3A also sets out certain preferred molar and mass flow rates for a 250 kW fuel cell electric power generation system that is operating in a preferred steady-state mode. These molar and mass flow rates may generally be scaled up for electric power generation systems with higher electrical outputs, or down for systems with lower electrical outputs.

Over the course of the system's operating cycle, the temperature and pressure of the identified fluid streams may change in accordance with different operating modes, such as start-up, transient, peak, low, and stand-by power output modes. Accordingly, the system may be operated for extended periods of time with a temperature and/or pressure of a particular fluid stream which is different from the "nominal" preferred value set out in the table of FIG. 3A, but which is still within the desirable range set out for that particular fluid stream in the table of FIG. 3B.

With reference to FIG. 2, the fuel processing subsystem directs raw inlet fuel stream 1 to fuel compressor 202. Fuel compressor 202 pressurizes the downstream fuel processing subsystem. Hydrogen is needed for participating in reactions within downstream desulfurizer 212 for removing sulfur from the raw inlet fuel stream. Hydrogen is provided through stream 34 by recycling a portion of hydrogen-rich fuel stream 12. In the system of FIG. 2, recycled hydrogen-rich fuel stream 34 is introduced into raw inlet fuel stream 1 upstream of compressor 202, thereby eliminating the need for a hydrogen recycle compressor, such as compressor 126, employed in the prior art system of FIG. 1. Raw inlet fuel stream 1 is thus enriched with hydrogen from recycled hydrogen-rich fuel stream 34 to provide hydrogen-enriched inlet fuel stream 2 to compressor 202.

In a preferred steady-state operating mode, the pressure of inlet fuel stream 2 is approximately 10 psig (69 kPa) when it is directed to fuel compressor 202. The pressure of pressurized fuel stream 3 exiting fuel compressor 202 is between 10–450 psig (69–3103 kPa), and during steady operating conditions, preferably between approximately 70–80 psig (483–552 kpa). Fuel compressor 202 may further comprise an inlet fuel filter for filtering particulates from inlet fuel stream 2 upstream of the compression section of compressor 202. An additional fuel filter 204 may be located downstream of fuel compressor 202.

Stream 33 is a small portion of pressurized fuel stream 3 which may be directed to auxiliary burner 206 when auxiliary burner 206 is activated to provide additional heat to the furnace burner exhaust gas for operating turbine 208. Fuel stream 4 is the remainder of pressurized fuel stream 3 that is directed to desulfurizer pre-heater 210.

Desulfurizer pre-heater 210 comprises a hollow heating element disposed within furnace 216. Preferably the heating element is located within furnace 216 where it is directly exposed to a hot gas stream generated by furnace burner 218. Heat is transferred from the hot gas stream to pressurized fuel stream 4 flowing through the hollow heating element of desulfurizer pre-heater 210. The heated pressurized fuel stream enters desulfurizer pre-heater 210 with a temperature of approximately 290° F. (143° C.) and exits with a temperature of approximately 420° F. (216 ° C.). The pressure drop through desulfurizer pre-heater 210 is negligible. From desulfurizer pre-heater 210, pressurized fuel stream 5 is directed to desulfurizer 212, which is preferably a hydrodesulfurizer. Inside desulfurizer 212, sulfur compounds are converted to H$_2$S and removed in a zinc oxide bed. A pressure drop of approximately 3–5 psi (21–34 kPa) occurs through hydrodesulfurizer 212.

From desulfurizer 212, desulfurized fuel stream 6 is directed to fuel stream humidifier 214 where it is mixed with water and superheated. Humidifier 214 comprises an element that is disposed within furnace 216. Like desulfurizer pre-heater 210, fuel stream humidifier 214 is heated by hot gas from furnace burner 218. By disposing at least a portion of humidifier 214 within furnace 216, improved thermal efficiency is possible since there is less heat loss when the heat transfer occurs inside furnace 216 instead of directing the hot burner gas an external humidification assembly. In addition, it is generally less expensive to manufacture a humidifier assembly inside furnace 216. For example, materials and costs are saved since a separate humidifier vessel is not required since humidifier 214 is housed within the vessel of furnace 216.

From humidifier 214, the humidified fuel stream enters reformer 220, also housed within furnace 216. In a preferred embodiment, the fluid passages that connect fuel stream humidifier 214 to reformer 220 are internal to the combustion chamber of furnace 216. Reformer 220 converts the humidified fuel stream to a reformate fuel stream via the endothermic steam reformation reaction:

$$CH_4 + H_2O + heat \rightarrow 3H_2 + CO$$

As steam reformation occurs, a portion of the resulting CO is converted to CO$_2$ via the exothermic water gas shift reaction:

$$CO + H_2O \rightarrow H_2 + CO_2 + heat$$

The overall reaction is endothermic.

Figure 1:
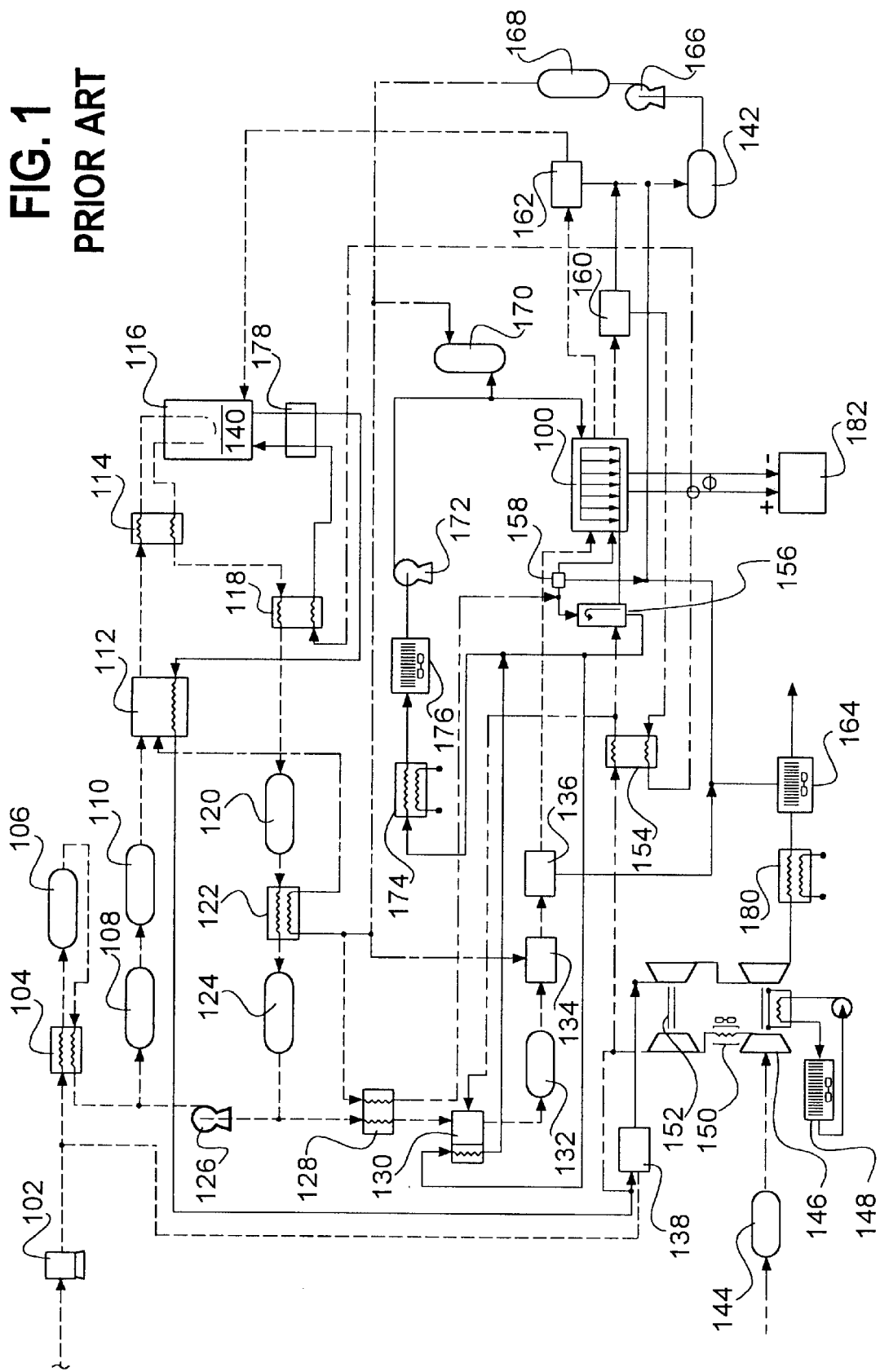
FIG. 1 is a schematic diagram of a prior art hydrocarbon fueled solid polymer fuel cell electric power generation system.

As with the system of FIG. 1, during normal operation, furnace burner 218 generates a hot burner gas by burning the residual fuel in anode exhaust stream with oxygen provided by the cathode exhaust stream. When the anode exhaust stream is inadequate for this purpose, for example, during start-up, valve 222 is opened so that a portion of inlet fuel stream 4 may be directed to furnace burner 218.

During normal operation, when the inlet fuel comprises natural gas, reformer 220 typically converts approximately 70 to 100% of the CH$_4$ to H$_2$, CO and CO$_2$. Normally over 80% of the hydrogen that is ultimately produced by the fuel processing subsystem is produced by the reactions induced within reformer 220. Reformate fuel stream 7 comprises H$_2$, H$_2$O, CO$_2$, CO, and CH$_4$ when it exits reformer 220.

After exiting reformer 220, the reformate fuel stream is cooled as it passes through shift precooler 224, where some of its heat is transferred to cathode exhaust stream 24 which is being directed to furnace burner 218. For example, during normal operation, cathode exhaust stream 24 enters shift precooler 224 with a temperature of approximately 365° F. (185° C.) and exits with a temperature of approximately 660° F. (349° C.)(stream 25). Reformate fuel stream 7 enters shift precooler 224 with a temperature of approximately 935° F. ((502 ° C.) and exits with a temperature of approximately 405° F. (207° C.)(stream 8).

From shift precooler 224, reformate fuel stream 8 is directed to shift reactor 226. In shift reactor 226 most of the CO in the reformate fuel stream reacts with the remaining steam to produce additional hydrogen via the exothermic water gas shift reaction:

$$CO + H_2O \rightarrow H_2 + CO_2 + heat$$

Shift reactor 226 has two stages. In the first stage, reformate fuel stream 8 is cooled by cathode exhaust stream 23 which is heated while passing therethrough from approximately 240° F. (116° C.) to 365° F. (185° C.). Cooling during the first stage obviates the need for an intercooler in-between the first and second stages. In the second stage, the shift reaction is allowed to proceed adiabatically. Preferably, during normal operation, the concentration of CO in reformate fuel stream 9 is approximately 0.1% to 0.3% (dry molar basis) when it exits shift reactor 226. In the preferred embodiment illustrated in FIG. 2, shift reactor 226 is a single vessel with a two stage reactor disposed therein.

From shift reactor 226, reformate fuel stream 9 is cooled by indirect heat exchange with fuel stream humidifier feed-water stream 35 in selective oxidizer precooler 228. For example, during normal steady-state operation, reformate fuel stream 9 enters precooler 228 with a temperature of approximately 345° F. (174° C.) and exits with a temperature of approximately 255° F. (124° C.)(stream 10). Humidifier feedwater stream 35 enters precooler 228 with a temperature of approximately 175° F. (79° C.) and exits as stream 36 with a temperature of approximately 250° F. (121° C.). Thus humidifier feedwater stream 36 is advantageously heated prior to being directed to humidifier 214.

Oxidant stream 31 from the oxidant subsystem is combined with reformate fuel stream 10 prior to entering selective oxidizer 230. As shown in FIG. 2, oxidant stream 31 may also provide additional oxygen to reformate fuel stream 10 as it is flowing through selective oxidizer 230. Selective oxidizer 230 is designed and operated such that the oxygen in reformate fuel stream 10 reacts preferentially with CO to form CO$_2$ according to the following reaction:

$$CO + \tfrac{1}{2}O_2 \rightarrow CO_2 + \text{heat}$$

Selective oxidizer 230 thus reduces the concentration of CO in reformate fuel stream 10 to produce hydrogen-rich fuel stream 11 which preferably comprises less than approximately 10 ppm CO (dry molar basis). To reduce the concentration of CO to this low level requires more oxygen than the stoichiometric requirement for combustion of the CO. Most of the excess $O_2$ in hydrogen-rich fuel stream 11 reacts with $H_2$ to form water. The amount of oxidant added to reformate fuel stream 10 preferably corresponds with an oxygen flow rate of approximately 2.0 to 6.5 times the stoichiometric amount of $O_2$ required within selective oxidizer 230 for oxidation of the CO in reformate fuel stream 10.

Hydrogen-rich fuel stream 11 exits selective oxidizer 230 and is cooled by passing through anode precooler 232 where heat is transferred to a portion of temperature control fluid stream 41 which is directed to anode precooler 232. Hydrogen-rich fuel stream 11 enters anode precooler 232 with a temperature of approximately 320° F. (160) and exits with a temperature of approximately 170° F. (77° C.). Unlike the prior art system in FIG. 1, the embodiment illustrated in FIG. 2 employs a heat exchanger to indirectly cool hydrogen-rich fuel stream 11, instead of a water spray. Indirect heat exchange is preferable at this location because with cooling, such as with a water spray, more $CO_2$ dissolves into the spray water that is recovered by the water circulation subsystem. Removing the dissolved $CO_2$ from the recovered spray water adds to the complexity of the water circulation subsystem.

Water separator 234 receives the hydrogen-rich fuel stream after it exits anode precooler 232. Water separator 234 removes condensed water from the hydrogen-rich fuel stream. The recovered water is directed to water tank 236, which holds the recycled water until the system needs it.

As noted above, hydrogen-rich fuel stream 34 is a small portion of fuel stream 12, (typically less than one percent by mass), which is recycled back to inlet fuel stream 1. Recycled hydrogen-rich fuel stream 34 provides the hydrogen that is required to promote the desired reactions in desulfurizer 212. In the preferred embodiment illustrated by FIG. 2, recycled hydrogen-rich fuel stream 34 is taken from a point downstream of water separator 234. During normal operation, hydrogen-rich fuel stream 12 has a pressure of about 55 psig (379 kPa), which is ample pressure for introducing hydrogen-rich fuel stream 34 into inlet fuel stream 1, which typically has a pressure of about 10 psig (69 kPa) or less. Those skilled in the art will understand that, in alternative embodiments, the source for the recycled fuel stream may be any point downstream of reformer 220 since more than 80% of the hydrogen in hydrogen-rich fuel stream 12 is typically produced within reformer 220.

Oxidant stream 32 is a small amount of pressurized oxidant (that is, normally less than 1% of inlet oxidant stream 16) which is added to hydrogen-rich fuel stream 12 just upstream of the anode inlet of fuel cell stack 200 to form hydrogen-rich fuel stream 13. When hydrogen-rich fuel stream 13 is directed to the anodes of fuel cell stack 200, the oxygen therein helps to reduce the effect of carbon monoxide poisoning at the fuel cell anode catalyst.

In fuel cell stack 200, 50–90% of the hydrogen in hydrogen-rich fuel stream 13 is consumed before the hydrogen-depleted fuel is expelled from fuel cell stack 200 as anode exhaust stream 14. Excess water in anode exhaust stream 14 is removed by water separator 240 and the recovered water is directed to water tank 236. Dewatered anode exhaust stream 15 then flows to furnace burner 218 where it is burned to generate heat inside furnace 216.

The oxidant subsystem of FIG. 2 comprises the following components: oxidant filter 242, first direct cooling device 244, turbocompressor first stage 246, second direct cooling device 248, turbocompressor second stage 250, and humidifier 252. In the preferred embodiment illustrated in FIG. 2, turbocompressor first and second stages, 246 and 248 respectively, are mounted on the same shaft and are driven by the same turbine 208. In the same manner, more than two turbocompressor stages may be mounted on the same shaft to increase the pressure in the oxidant subsystem. An advantage of using a single shaft with multiple turbocompressor stages is that there are less shaft bearings and only one turbine is required to drive the single shaft.

Initially, in a preferred embodiment, inlet oxidant stream 16 is drawn from the ambient air into the oxidant subsystem through filter 242, which filters out particulates.

In the preferred embodiment of FIG. 2, inlet oxidant stream 16 is then directed to cooling device 244. Cooling device 244, may be, for example, a device for injecting a fine spray of water into the inlet oxidant stream. As shown in FIG. 2, a portion of pressurized oxidant stream 18 may be directed through fluid passage 245 to cooling device 244 to assist with dispersing the water spray. Cooling device 244 cools inlet oxidant stream 16 directly by causing direct contact between inlet oxidant stream 16 and the water spray. The amount of water that is sprayed into the inlet oxidant stream may be controlled to adjust for variations in the temperature of inlet oxidant stream 16. The water cools inlet oxidant stream 16 and thereby reduces the power required for compression and also helps to humidify the oxidant stream.

After passing through cooling device 244, the oxidant stream is directed to turbocompressor first stage 246. Compression of the oxidant stream in turbocompressor first stage 246 imparts heat to the inlet oxidant stream. At the outlet of turbocompressor first stage 246, cooling device 248 may be employed as shown in the preferred embodiment of FIG. 2. Cooling device 248 injects a second water spray directly into the inlet oxidant stream. As with cooling device 244, pressurized oxidant stream 18 may be utilized as a source for pressurized oxidant which is directed to cooling device 248 through fluid passage 247 to assist with dispersing the water spray. The cooled oxidant stream is then directed to turbocompressor second stage 250. With cooling devices 244 and 248, an indirect heat exchanger intercooler is not required. A portion of pressurized oxidant stream 17 which has exited turbocompressor second stage 250 is directed through fluid passage 251 to the turbocompressor air bearings. The oxidant exiting the air bearings is preferably directed to auxiliary burner 206 as shown in FIG. 2. The turbocompressor air bearings eliminate the need for bearing oil and a bearing oil cooler subsystem.

Energy to drive turbocompressor turbine 208 is provided primarily by the expansion of furnace burner exhaust stream 26. When needed, auxiliary burner 206 combusts fuel and oxygen to generate heat to supplement the energy in furnace burner exhaust stream 26. Fuel from fuel stream 3 is directed to auxiliary burner 206, as needed, by fuel stream 33 fuel. Oxygen from pressurized oxidant stream 17 and the turbocompressor air bearings is provided to auxiliary burner 206 by oxidant stream 30.

Downstream of turbocompressor second stage 250, the oxidant subsystem comprises several branches for distributing pressurized oxidant stream 17 to different components of the fuel cell electric power generation system. Oxidant stream 30, mentioned above, for example, is one of these branches. Oxidant stream 30 is typically between 0% and 4% of the inlet oxidant stream when auxiliary burner 206 is needed.

Oxidant stream 31 is another branch which directs a portion of pressurized oxidant stream 17 to selective oxidizer 230. Oxidant stream 31 is typically less than about 1% of inlet oxidant stream 16.

While describing the fuel processing subsystem above, it has already been disclosed that oxidant stream 32 is yet another branch of the oxidant subsystem which directs a small portion of pressurized oxidant stream 17 to hydrogen-rich fuel stream 12 close to the anode inlet of fuel cell stack 200.

Oxidant stream 18 comprises the remainder, and majority of pressurized oxidant stream 17, and it is directed to the cathodes of fuel cell stack 200 where it provides oxygen for participating in the desired electrochemical reaction that is catalytically induced at the cathodes.

The pressure of pressurized oxidant stream 17 is preferably between 10–400 psig (69–2758 kPa) and during normal steady-state operation, preferably about 50 to 60 psig (345 to 414 kPa). The temperature of pressurized oxidant stream 17 exiting turbocompressor second stage 250 may vary between 100 to 250° F. (38 to 121° C.), but during normal steady-state operation, because of the first and second direct cooling devices, the temperature is normally about 185° F. (85° C.). Since the temperature of pressurized oxidant stream 17 is normally already close to the typical operating temperature of fuel cell stack 200, there is normally no need for a separate cathode precooler heat exchanger. Instead, humidifier 252 can be employed to make final adjustments to the humidity and temperature of pressurized oxidant stream 18 before it is directed to the cathodes of fuel cell stack 200. During normal steady-state operation, the temperature of humidified oxidant stream 19 which exits humidifier 252 is approximately 165–170° F. (74–77° C.). In a preferred embodiment, humidifier 252 is the last oxidant subsystem component through which pressurized oxidant stream 18 passes before humidified oxidant stream 19 is directed to the cathodes of fuel cell stack 200. At the cathodes, about 40–70% of the oxygen in pressurized oxidant stream 19 is consumed.

The oxygen-depleted pressurized oxidant stream exits fuel cell stack 200 as cathode exhaust stream 20. Water produced at the cathode as a result of the catalytically induced reactions is expelled from fuel cell stack 200 with cathode exhaust stream 20. This product water is condensed from the cathode exhaust stream in condenser 254 and removed from cathode exhaust stream 21 in water separator 256. The recovered water is directed to water tank 236.

The residual oxygen remaining in the cathode exhaust stream that is ejected from the cathodes of fuel cell stack 200 is ultimately directed to furnace burner 218. Between the cathode outlet of fuel cell stack 200 and furnace burner 218 the cathode exhaust stream is advantageously employed as a heat transfer fluid to assist with the thermal management within the fuel cell electric power generation system. The cathode exhaust fluid acts as a coolant fluid in several system components, while the cathode exhaust is itself advantageously heated prior to being introduced to furnace burner 218.

After exiting water separator 256, cathode exhaust stream 22 may be directed to flow through preheater 258 where it extracts residual heat from turbine exhaust stream 28 to improve the system thermal efficiency. Turbine exhaust stream 29 which exits preheater 258 is vented from the system. Downstream of preheater 258 cathode exhaust stream 23 is employed as a coolant fluid within shift reactor 226. If more cooling is needed in shift reactor 226, some or all of cathode exhaust stream 22 may by-pass preheater 258. During normal steady-state operating conditions, cathode exhaust stream 23 exits preheater 258 at an approximate temperature of 240° F. (116° C.).

When cathode exhaust stream 23 is directed to shift reactor 226, it absorbs heat from the first stage exothermic water-gas shift reaction. After exiting shift reactor 226, cathode exhaust stream 24 then flows to shift precooler 224, which is an indirect heat exchanger. Shift precooler 224 transfers heat from the hot reformate fuel stream which has just come from reformer 220 inside furnace 216. During normal steady-state operation, cathode exhaust stream 25 which exits shift precooler 224 has a temperature of about 660° F. (349° C.). Heated cathode exhaust stream 25 is finally directed to furnace burner 218 where it provides oxygen for burning the residual fuel in anode exhaust stream 15.

The hot burner gas produced by furnace burner 218 is first employed inside furnace 216 to provide thermal energy for the endothermic reformation reactions inside reformer 220, preheating inlet fuel stream 4 upstream of desulfurizer 212, and for vaporizing and humidifying fuel stream 6 upstream of reformer 220. After heat has been transferred within furnace 216 for these purposes, the hot burner gas is exhausted from furnace 216 as burner exhaust stream 26 which is directed to auxiliary burner 206. Burner exhaust stream 26 is primarily used to provide energy to drive turbine 208 of the turbocompressor. If turbine 208 requires more energy than what is available in burner exhaust stream 26, auxiliary burner 206 is employed to add whatever additional thermal energy is needed. From auxiliary burner 206, burner exhaust stream 27 is directed to turbine 208.

Since the water circulation subsystem interacts with the fuel processing subsystem, the oxidant subsystem, and the temperature control subsystem, many of the components of the water circulation subsystem have already been mentioned while describing the subsystems already discussed with reference to FIG. 2.

Water tank 236 collects liquid water recovered from the other subsystems. In particular, water is recovered from: the fuel processing subsystem using water separator 234; the oxidant subsystem by draining the excess water which is not vaporized in humidifier 252; the anode exhaust stream using water separator 240; and the cathode exhaust stream using water separator 256. Some of the water recovered from humidifier 252 is directed to cooling devices 244 and 248 through respective fluid passages 245 and 247. Supplementary water may be provided to water tank 236 through water make-up line 259.

Water from water tank 236 is pumped by water circulation pump 260, through water filter 262. The circulation water is then divided into two separate streams. First circulation water stream 35 flows through selective oxidizer precooler 228, where it absorbs heat from reformate fuel stream 35. Heated circulation water stream 36 mixes with desulfurized fuel stream 6 inside fuel stream humidifier 214, as described above.

Second circulation water stream 37 flows through heat exchanger 264 where heat is exchanged between the circulation water and temperature control fluid stream 43. During normal steady-state operation, the circulation water flowing through heat exchanger 264 is cooled by about 10° F. (6° C.) from about 175° F. (79° C.) to about 165 F. (74° C.).

Circulation water stream 38 which exits heat exchanger 264 is then directed to humidifier 252. In the preferred embodiment, circulation water stream 38 is sprayed into the pressurized oxidant stream to raise the humidity of oxidant stream 18 before it is introduced to the cathodes of fuel cell stack 200. Excess humidification water is recovered and returned to water tank 236 (stream 39).

Because the temperature of the circulation water exiting heat exchanger 264 influences the temperature of pressurized oxidant stream 19 which is directed to fuel cell stack 200, and the temperature control fluid is employed as the primary means for controlling the temperature of fuel cell stack 200, heat exchanger 264 may be employed to establish a thermal relationship between the water circulation subsystem and the temperature control subsystem for better control of the temperature in fuel cell stack 200.

With reference to the embodiment depicted by FIG. 2 the temperature control subsystem is a closed loop which is fluidly isolated from the other subsystems. The temperature control fluid is distributed to components within this temperature control loop. In the illustrated preferred embodiment, components within the temperature control loop comprise temperature control pump 266, inverter 268 in the power conversion subsystem, temperature control heat exchanger 270, deionizer 272, fuel cell stack 200, anode precooler 232, heat exchanger 264, and a cooling jacket for fuel compressor 202.

Temperature control pump 266 distributes portions of pressurized temperature control fluid stream 41 to all of the above components within the temperature control loop. The temperature control fluid may be selected from the group consisting of mixtures of water and ethylene glycol, mixtures of water and propylene glycol, water, perfluorocarbon compounds, and non-electrically conductive oils, such as, for example paraffinic oils. In a preferred embodiment, the temperature control fluid is one that can quickly absorb heat and which has a freezing temperature less than or equal to 32° F. (0° C.). The preferred temperature control fluid may depend upon the environment where the fuel cell electric power generation system is located. For example, in indoor operating environments or tropical locations where the system is not exposed to temperatures of 32° F. (0° C.) or less, water may be the preferred temperature control fluid. However, when the system is employed in a location where it may be exposed to colder temperatures, a temperature control fluid with a lower freezing temperature such as a mixture of water and ethylene-glycol or propylene glycol may be preferred. Until recently, glycols were considered incompatible with fuel cell systems but by employing deionizer 272 glycols may be employed without damaging the system. The selected temperature control fluid preferably has a freezing temperature that is lower than the coldest temperature to which is the system is expected to be exposed. When a temperature control fluid other than water is employed, it may be preferable to keep the pressure of the temperature control fluid flowing through fuel cell stack 200 lower than the pressure of any reactant streams which are also flowing through fluid passages within fuel cell stack 200. Conversely, when the temperature control fluid is water, it is preferable to maintain the water pressure in the fluid passages within fuel cell stack 200 higher than the pressure of the reactant streams flowing through fuel cell stack 200.

During normal operation, the temperature control subsystem absorbs thermal energy from the other subsystems to provide cooling. Temperature control heat exchanger 270 dissipates the thermal energy that is collected from other subsystems and supplies a cooled temperature control fluid stream (that is, stream 40) to temperature control pump 266. The amount of heat that is dissipated is controlled to maintain fuel cell stack 200 at the desired temperature.

In the preferred embodiment of FIG. 2, temperature control fluid stream 45 is directed through one branch fluid passage which directs the majority of the temperature control fluid to fuel cell stack 200. Parallel fluid passages direct portions of the temperature control fluid to anode precooler 232 and to heat exchanger 264. As shown in FIG. 2, the temperature control fluid which exits anode precooler 232 rejoins the branch fluid passage that directs combined temperature control fluid stream 42 to fuel cell stack 200. Temperature control fluid stream 43 is directed by a parallel fluid passage to heat exchanger 264. Temperature control fluid stream 44 exits heat exchanger 264 and combines with temperature control fluid stream 42 to form combined temperature control fluid stream 45 which is directed to fuel cell stack 200. Temperature control fluid stream 46 exits fuel cell stack 200 and returns to temperature control heat exchanger 270.

Since the temperature control fluid may absorb ions as it passes through the fluid passages and equipment in the temperature control fluid loop, in the preferred embodiment, a parallel flow passage from the outlet of temperature control pump 266 directs a portion of the temperature control fluid through deionizer 272. The temperature control fluid that is directed to deionizer 272 is returned to the inlet of temperature control pump 266 without passing through temperature control heat exchanger 270 again.

In a particularly preferred embodiment, such as the system depicted in FIGS. 2 and 3, the thermal energy generated by the electric power generation subsystem may be recovered and employed as a source of energy which may be consumed for beneficial purposes external to the fuel cell electric power generation system. For example, the recovered thermal energy may be employed to heat a building, or to provide heat for an adsorption chiller. With reference to FIGS. 2 and 3, fluid passage 274 directs a heat transfer fluid to cogeneration heat exchanger 276 whereby thermal energy is indirectly transferred from the temperature control fluid to the heat transfer fluid. Cogeneration heat exchanger 276 is preferably located downstream of fuel cell stack 200 to recover the thermal energy from the temperature control fluid before it is recycled to temperature control heat exchanger 270. Fluid passage 278 directs the heat transfer fluid away from cogeneration heat exchanger 276 and to a location external to the fuel cell electric power generation system. The heat transfer fluid may be any fluid which can readily absorb thermal energy, such as, for example, water.

Line 280 represents the electrical connection between fuel cell stack 200 and inverter 268 of a power conversion subsystem for conducting the direct current electricity generated by fuel cell stack 200 to inverter 268.

FIG. 4 illustrates another preferred embodiment of the fuel cell electric power generation system. Components which correspond to similar components in FIG. 2 have been identified by the same reference numbers. A difference between the systems of FIG. 2 and FIG. 4 is that in FIG. 4, the temperature control subsystem is divided into two fluidly isolated temperature control loops. Deionized filtered water is employed as the temperature control fluid in a fuel cell stack temperature control loop and a freeze-tolerant fluid is employed as the temperature control fluid in a freeze-tolerant temperature control loop. For example, the freeze-tolerant fluid may be a mixture of water and ethylene glycol, a mixture of water and propylene glycol, or a fluorocarbon compound, or an electrically non-conductive oil, such as, for example, paraffinic oils. This embodiment may be preferred over that of FIG. 2 if the freeze-tolerant fluid is not compatible with the materials of construction employed for fuel cell stack 200.

The fuel cell stack temperature control loop of FIG. 4 preferably comprises anode precooler 232 and heat exchanger 264 so that the temperature of fuel cell stack 200 may be coordinated with the temperature of the fuel and oxidant streams directed to the respective anodes and cathodes of fuel cell stack 200. Pump 300 provides the water pressure needed to circulate the cooling water throughout the fuel cell stack temperature control loop. In the system of FIG. 4, since water is employed as the temperature control fluid in fuel cell stack 200, as mentioned above, as a precaution, to reduce the effect of leaks which may develop within fuel cell stack 200, pump 300 keeps the pressure of the cooling water flowing through fuel cell stack 200 higher than the pressure of the fuel and oxidant streams which also flow through fuel cell stack 200. If a leak does develop, in this embodiment it is generally preferable for the cooling water to leak into the reactant fluid streams instead of the reactants leaking into the cooling water. The cooling water loop is fluidly connected to the water circulation subsystem by fluid passage 301.

Normally the pressure in the fuel cell stack temperature control loop is kept higher than the pressure in the water circulation subsystem, because this ensures that the pressure of the cooling water exiting fuel cell stack 200 is higher than the pressure of the oxidant stream entering the fuel cell cathode (that is, so that the pressure of the temperature control fluid within fuel cell stack 200 is higher than the pressure of the pressurized oxidant stream within fuel cell stack 200). Fluid passage 301 allows water to flow between the fuel cell stack temperature control loop and the water circulation subsystem to accommodate thermal expansion and contraction associated with water flowing through the fuel cell stack temperature control loop. Fluid passage 301 also provides a fluid passage for supplying make-up water to the fuel cell stack temperature control loop.

Pump 300 directs deionized and filtered cooling water through several parallel cooling loops. The main cooling loop delivers cooling water to anode precooler 232 and then to fuel cell stack 200. A second parallel cooling loop directs cooling water to heat exchanger 264. A third parallel loop directs cooling water to deionizer 302 for removing ions that may accumulate in the cooling water stream as it flows through fuel cell stack 200. Cooling water flowing through deionizer 302 does not undergo any significant temperature change so water flowing through the deionizer loop may be recycled directly back to the inlet side of pump 300; however, the other cooling water loops return water that has absorbed heat, from the power generation subsystem (fuel cell stack 200), the fuel processing subsystem (anode precooler 232), and the oxidant subsystem (via heat exchanger 254). Cooling water that has absorbed heat from the other subsystems is directed to indirect heat exchanger 304 where the heat is transferred to the freeze-tolerant temperature control loop, before the cooling water is returned to pump 300.

The freeze-tolerant temperature control loop circulates a freeze-tolerant cooling fluid to heat exchanger 304, and through a plurality of parallel cooling loops for absorbing heat from components of the fuel processing subsystem (for example, fuel compressor 202 and fuel by-pass heat exchanger 310), the oxidant subsystem (for example, oxidant intercooler 312 and heat exchanger 314 for cooling the pressurized oxidant stream which is directed to the air turbocompressor bearings), the inverter 268 of the power conversion subsystem, and cathode exhaust cooler 316 which cools the cathode exhaust stream to condense water vapor for recovery by water separator 256. Heat absorbed by the freeze-tolerant fluid is dissipated to the atmosphere via temperature control heat exchanger 270.

FIG. 4 illustrates a system which employs several alternative and interchangeable features relative to the system of FIG. 2. For example, oxidant intercooler 312 is employed instead of direct cooling devices 244 and 24 8. Another example is that in FIG. 4, the temperature control fluid (that is, in this case cooling water) exiting heat exchanger 264 is recycled without passing through fuel cell stack 200. In the system of FIG. 2, temperature control fluid stream 44 exits heat exchanger 264 and is combined with temperature control fluid stream 42 that is directed to the cooling passages of fuel cell stack 200 (stream 45) before being recycled. The system of FIG. 4 is also different from that of FIG. 2 in that it does not inject any pressurized oxidant directly into the hydrogen-rich fuel stream immediately upstream of fuel cell stack 200. An advantage of this embodiment is that it increases system efficiency and generally reduces the cost and complexity of the system. However, compared to the embodiment of FIG. 2, this embodiment requires a higher degree of fuel processing to remove more of the carbon monoxide from the hydrogen-rich fuel stream and/or a fuel cell stack with a greater tolerance to carbon monoxide poisoning.

The system of FIG. 4 also comprises additional features that may be employed in the system of FIG. 2. For example, heat exchanger 314 may be employed in the system of FIG. 2 to cool the pressurized oxidant before it is directed to the turbocompressor air bearings. Similarly, the system of FIG. 4 comprises fuel by-pass loop 320, which permits the inlet fuel stream flow rate to be reduced below the minimum flow rate of fuel compressor 202, for improved turn-down capability, by recycling a portion of the inlet fuel stream back to the compressor inlet. Fuel by-pass heat exchanger 310 prevents the recycled fuel from overheating the inlet fuel stream.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A fuel cell electric power generation system comprising:
   (A) an electric power generation subsystem comprising at least one fuel cell which comprises a cathode, an anode, and an ion exchange membrane disposed therebetween, said anode having a catalyst associated therewith for producing electrons and protons from a hydrogen-rich fuel stream, said cathode having a catalyst associated therewith for promoting the reaction of oxygen with said protons and electrons to form water and heat;
   (B) a fuel processing subsystem for generating said hydrogen-rich fuel stream, said fuel processing subsystem comprising:
      (1) a fuel compressor for increasing the pressure of an inlet fuel stream;
      (2) a desulfurizer for receiving an inlet fuel stream and producing desulfurized fuel stream by removing sulfur from said inlet fuel stream;

(3) a furnace comprising:
  (a) a furnace burner which produces a hot burner gas for providing heat within said furnace, wherein said hot burner gas if fluidly isolated from said inlet fuel stream, said desulfurized fuel stream, and a reformate fuel stream;
  (b) a reformer disposed within said furnace for catalytically converting said desulfurized fuel stream into said reformate fuel stream, which comprises hydrogen, carbon monoxide, carbon dioxide, and water vapor; and
  (c) at least one heat exchanger assembly disposed within said furnace for transferring heat from said hot burner gas to said inlet fuel stream to heat said inlet fuel stream upstream of said desulfurizer;
(4) a recycling passage for recycling a portion of said hydrogen-rich fuel stream into said inlet fuel stream upstream of said fuel compressor for providing hydrogen to said desulfurizer;
(5) a fuel processor for processing said reformate fuel stream to reduce the concentration of carbon monoxide to produce said hydrogen-rich fuel stream; and
(6) a fuel feed passage for directing said hydrogen-rich stream from said fuel processing subsystem to said anode;
(C) an oxidant subsystem for pressurizing an inlet oxidant stream and directing a pressurized oxidant stream to said cathode;
(D) a water circulation subsystem for circulating and recovering water within said fuel cell electric power generation system for humidification of said desulfurized fuel stream and said pressurized oxidant stream and for cooling; and
(E) a temperature control subsystem for circulating a temperature control fluid for controlling the temperature within said fuel cell electric power generation system.

2. The fuel cell electric power generation system of claim 1 wherein said desulfurizer is a hydrodesulfurizer.

3. The fuel cell electric power generation system of claim 1 wherein said fuel processor comprises a shift reactor for receiving said reformate fuel stream downstream of said reformer and reacting carbon monoxide in said reformate fuel stream with water to produce carbon dioxide and hydrogen.

4. The fuel cell electric power generation system of claim 3 wherein said fuel processor further comprises a selective oxidizer for receiving said reformate fuel stream downstream of said shift reactor and reacting carbon monoxide in said reformate fuel stream with oxygen to produce carbon dioxide.

5. The fuel cell electric power generation system of claim 1 wherein said fuel processing subsystem further comprises a fuel compressor for increasing the pressure of said inlet fuel stream.

6. A fuel cell electric power generation system comprising:
(A) an electric power generation subsystem comprising at least one fuel cell which comprises a cathode, an anode, and an ion exchange membrane disposed therebetween, said anode having a catalyst associated therewith for producing electrons and protons from a hydrogen-rich fuel stream, said cathode having a catalyst associated therewith for promoting the reaction of oxygen with said protons and electrons to form water and heat;
(B) a fuel processing subsystem for generating said hydrogen-rich fuel stream, said fuel processing subsystem comprising:
  (1) a fuel compressor for increasing the pressure of an inlet fuel stream;
  (2) a desulfurizer for receiving said inlet fuel stream and producing a desulfurized fuel stream by removing sulfur from said inlet fuel stream;
  (3) a furnace comprising:
    (a) a furnace burner which produces a hot burner gas for providing heat within said furnace; and
    (b) a reformer disposed within said furnace for catalytically converting said desulfurized fuel stream into a reformate fuel stream, which comprises hydrogen, carbon monoxide, carbon dioxide, and water vapor;
  (4) a recycling passage for recycling a portion of said hydrogen-rich fuel stream into said inlet fuel stream upstream of said fuel compressor for providing hydrogen to said desulfurizer;
  (5) a fuel processor for processing said reformate fuel stream to reduce the concentration of carbon monoxide to produce said hydrogen-rich fuel stream; and
  (6) a fuel feed passage for directing said hydrogen-rich fuel stream from said fuel processing subsystem to said anode;
(C) an oxidant subsystem for pressurizing an inlet oxidant stream and directing a pressurized oxidant stream to said cathode;
(D) a water circulation subsystem for circulating and recovering water within said fuel cell electric power generation system for humidification of said desulfurized fuel stream and said pressurized oxidant stream and for cooling; and
(E) a temperature control subsystem for circulating a temperature control fluid for controlling the temperature within said fuel cell electric power generation system.

7. The fuel cell electric power generation system of claim 6 wherein said fuel processing subsystem further comprises a heat exchanger assembly disposed within said furnace for transferring heat from said hot burner gas to said inlet fuel stream upstream of said desulfurizer.

8. The fuel cell electric power generation system of claim 6 wherein said fuel processor comprises a shift reactor for receiving said reformate fuel stream downstream of said reformer and reacting carbon monoxide in said reformate fuel stream with water to produce carbon dioxide and hydrogen.

9. The fuel cell electric power generation system of claim 8 wherein said fuel processor further comprises a selective oxidizer for receiving said reformate fuel stream downstream of said shift reactor and reacting carbon monoxide in said reformate fuel stream with oxygen to produce carbon dioxide.

10. A fuel cell electric power generation system comprising:
(A) an electric power generation subsystem comprising at least one fuel cell which comprises a cathode, an anode, and an ion exchange membrane disposed therebetween, said anode having a catalyst associated therewith for producing electrons and protons from a hydrogen-rich fuel stream, said cathode having a catalyst associated therewith for promoting the reaction of oxygen with said protons and electrons to form water and heat, and a cathode exhaust port associated with said cathode for exhausting a cathode exhaust stream comprising residual oxygen from said cathode;
(B) a fuel processing subsystem for generating said hydrogen-rich fuel stream, said fuel processing subsystem comprising:

(1) a fuel compressor for increasing the pressure of an inlet fuel stream;
(2) a desulfurizer for receiving an inlet fuel stream and producing desulfurized fuel stream by removing sulfur from said inlet fuel stream;
(3) a furnace comprising:
   (a) a furnace burner which produces a hot burner gas for providing heat within said furnace; and
   (b) a reformer disposed within said furnace for catalytically converting a fuel stream comprising hydrocarbons into a reformate fuel stream, which comprises hydrogen, carbon monoxide, carbon dioxide and water vapor;
(4) a recycling passage for recycling a portion of said hydrogen-rich fuel stream into said inlet fuel stream upstream of said fuel compressor for providing hydrogen to said desulfurizer;
(5) a fuel processor for processing said reformate fuel stream to reduce the concentration of carbon monoxide to produce said hydrogen-rich fuels stream, wherein said fuel processor comprises a shift reactor for receiving said reformate fuel stream downstream of said reformer and reacting carbon monoxide in said reformate fuel stream with water to produce carbon dioxide and hydrogen, wherein said shift reactor comprises an integral heat exchanger assembly for exchanging heat between said cathode exhaust stream and said shift reactor; and
(6) a fuel feed passage for directing said hydrogen-rich fuel stream from said fuel processing subsystem to said anode;
(C) an oxidant subsystem for pressurizing an inlet oxidant stream and directing a pressurized oxidant stream to said cathode; said oxidant subsystem further comprising a cathode exhaust recovery loop for directing said cathode exhaust stream from said cathode exhaust port to said furnace burner, via said integral heat exchanger assembly associated with said shift reactor, said cathode exhaust recovery loop comprising a preheater for transferring heat from said furnace burner exhaust stream to said cathode exhaust stream upstream of said integral heat exchanger assembly;
(D) a water circulation subsystem for circulating and recovering water within said fuel cell electric power generation system for humidification of said desulfurized fuel stream and said pressurized oxidant stream and for cooling; and
(E) a temperature control subsystem for circulating a temperature control fluid for controlling the temperature within said fuel cell electric power generation system.

11. The fuel cell electric power generation system of claim 10 wherein said fuel stream directed to said reformer is a desulfurized fuel stream and said fuel processing subsystem further comprises a desulfurizer for receiving said inlet fuel stream and removing sulfur therefrom to produce said desulfurized fuel stream.

12. The fuel cell electric power generation system of claim 11 wherein said desulfurizer is a hydrodesulfurizer that reacts hydrogen with sulfur in said inlet fuel stream.

13. The fuel cell electric power generation system of claim 12 further comprising a heat exchanger assembly disposed within said furnace for transferring heat from said hot burner gas to said inlet fuel stream to heat said inlet fuel stream upstream of said desulfurizer.

14. The fuel cell electric power generation system of claim 10 further comprising a selective oxidizer for receiving said reformate fuel stream downstream of said shift reactor and reacting carbon monoxide in said reformate fuel stream with oxygen to produce carbon dioxide.

15. The fuel cell electric power generation system of any one of claims 1 or 6, wherein said furnace further comprises a fuel stream humidifier disposed therein, wherein said fuel stream humidifier uses heat from said hot burner gas to vaporize and heat a mixture of said desulfurized fuel stream and water upstream of said reformer.

16. The fuel cell electric power generation system of claim 10 wherein said furnace further comprises a fuel stream humidifier disposed therein, wherein said fuel stream humidifier uses heat from said hot burner gas to vaporize and heat a mixture of said fuel stream comprising hydrocarbons and water, upstream of said reformer.

17. The fuel cell electric power generation system of any one of claims 1, 6 or 10, wherein said electric power generation subsystem comprises a plurality of fuel cells in at least one fuel cell stack.

18. The fuel cell electric power generation system of any one of claims 11, 9 or 14, wherein said furnace further comprises a furnace exhaust outlet through which said hot burner gas is exhausted as furnace burner exhaust gas; and said oxidant subsystem comprises:
   (1) an oxidant compressor which supplies a first portion of said pressurized oxidant stream to said cathode via a first oxidant feed passage, wherein said oxidant compressor is operably connected to a turbine that is activated by the expansion of said furnace burner exhaust gas which is directed to said turbine from said furnace exhaust outlet;
   (2) a humidification apparatus for humidifying said first portion of said pressurized oxidant stream upstream of said cathode; and
   (3) a second oxidant feed passage for supplying a second portion of said pressurized oxidant stream from said oxidant subsystem to said selective oxidizer.

19. The fuel cell electric power generation system of claim 18 further comprising:
   an auxiliary burner for providing supplementary heat to said furnace burner exhaust gas;
   a burner fuel feed passage for directing a portion of said inlet fuel stream to said auxiliary burner; and
   a burner oxidant feed passage for directing a portion of said pressurized oxidant stream to said auxiliary burner.

20. The fuel cell electric power generation system of any one of claims 1, 6 or 11 wherein said water circulation subsystem comprises:
   (1) a water reservoir for collecting recycled water and receiving make-up water;
   (2) a feedwater pump fed for introducing a first portion of circulation water from said water reservoir into said desulfurized fuel stream upstream of said reformer and a second portion of said circulation water to a humidifier for humidifying said pressurized oxidant stream upstream of said cathodes;
   (3) a water recovery apparatus for recovering water from fluid streams in subsystems within said fuel cell electric power generation system and returning water to said water reservoir.

21. The fuel cell electric power generation system of claim 20 wherein said fuel processing subsystem further comprises a fuel stream humidifier which receives and mixes said desulfurized fuel stream and said first portion of circulation water upstream of said reformer, wherein said fuel stream humidifier vaporizes said circulation water and heats said desulfurized fuel stream and water mixture.

22. The fuel cell electric power generation system of any one of claims 2, 8 or 10 further comprising a heat exchanger for transferring heat between said fuel processing subsystem and said water circulation subsystem for cooling said reformate fuel stream downstream of said shift reactor and heating said water before directing it to said reformer.

23. The fuel cell electric power generation system of any one of claims 5, 6, or 13, wherein said temperature control subsystem comprises:
    (1) a pump for circulating said temperature control fluid within said temperature control subsystem;
    (2) fluid passages within said electric power generation subsystem for exchanging heat between said electric power generation subsystem and said temperature control fluid;
    (3) a cooling jacket associated with said fuel compressor for circulating said temperature control fluid to cool said fuel compressor;
    (4) an anode precooler for transferring heat from said hydrogen-rich fuel stream to said temperature control fluid upstream of said anode;
    (5) a humidification feedwater cooler for transferring heat between said temperature control fluid and circulation water before said circulation water is directed to a humidifier for humidifying said pressurized oxidant stream upstream of said cathode; and
    (6) a temperature control heat exchanger for removing excess heat from said temperature control fluid in said temperature control subsystem.

24. The fuel cell electric power generation system of claim 23 wherein said temperature control fluid comprises water and said temperature control subsystem is fluidly connected to said water circulation subsystem.

25. The fuel cell electric power generation system of any one of claims 3 or 8 wherein a cathode exhaust stream is directed from said cathode to said furnace burner.

26. The fuel cell electric power generation system of claim 25 further comprising a shift reactor precooler for transferring heat from said fuel processing subsystem to said cathode exhaust stream for cooling said reformate fuel stream upstream of said shift reactor and heating said cathode exhaust stream upstream of said furnace burner.

27. The fuel cell electric power generation system of any one of claims 1, 6 or 10 wherein said temperature control subsystem normally operates as a closed loop.

28. The fuel cell electric power generation system of claim 27 wherein said temperature control fluid is selected from the group consisting of mixtures of water and ethylene glycol, mixtures of water and propylene glycol, electrically non-conductive oils, and perfluorocarbon compounds, and said temperature control subsystem further comprises a deionizing filter for removing ions from said temperature control fluid.

29. The fuel cell electric power generation system of any one of claims 1, 6 or 10, further comprising a condenser and water separator associated with a cathode exhaust stream exhausted from said cathode for removing water from said cathode exhaust stream.

30. The fuel cell electric power generation system of any one of claims 1, 6, or 10, further comprising a heat exchanger for transferring heat from said furnace burner exhaust to a cathode exhaust stream exhausted from said cathode.

31. The fuel cell electric power generation system of any one of claims 3, 8 or 10, further comprising a heat exchanger for transferring heat from said reformate fuel stream to a cathode exhaust stream wherein said reformate fuel stream passes through said heat exchanger upstream of said shift reactor, thereby cooling said reformate fuel stream before it enters said shift reactor.

32. The fuel cell electric power generation system of any one of claims 1, 6 or 10, further comprising an oxidant passage for directing a portion of said pressurized oxidant stream into said hydrogen-rich fuel stream upstream of said anode.

33. The fuel cell electric power generation system of any one of claims 4, 9 or 14, wherein said oxidant subsystem comprises an oxidant fluid passage for directing a portion of said pressurized oxidant stream into said reformate fuel stream upstream of said selective oxidizer.

34. The fuel cell electric power generation system of any one of claims 1, 6 or 10, further comprising an anode exhaust stream passage for directing an anode exhaust stream from said anode to said furnace burner.

35. The fuel cell electric power generation system of claim 34 further comprising a water separator disposed in said anode exhaust stream passage for removing water from said anode exhaust stream.

36. A furnace for a fuel cell electric power generation system comprising an electric power generation subsystem comprising at least one fuel cell which comprises a cathode, an anode, and an ion exchange membrane disposed therebetween, said anode having a catalyst associated therewith for producing electrons and protons from a hydrogen-rich fuel stream, said cathode having a catalyst associated therewith for promoting the reaction of oxygen with said protons and electrons to form water and heat, said furnace comprising:
    (A) a fuel processing subsystem for generating said hydrogen-rich fuel stream, said fuel processing subsystem comprising:
        (1) a fuel compressor for increasing the pressure of an inlet fuel stream;
        (2) a desulfurizer for receiving said inlet fuel stream an producing a desulfurized fuel stream by removing sulfur from said inlet fuel stream;
        (3) a furnace comprising:
            (a) a furnace burner which produces a hot burner gas for providing heat within said furnace; and
            (b) a reformer disposed within said furnace for catalytically converting said desulfurized fuel stream into a reformate fuel stream, which comprises hydrogen, carbon monoxide, carbon dioxide, and water vapor;
        (4) a recycling passage for recycling a portion of said hydrogen-rich fuel stream into said inlet fuel stream upstream of said fuel compressor for providing hydrogen to said desulfurizer;
        (5) a fuel processor for processing said reformate fuel stream to reduce the concentration of carbon monoxide to produce said hydrogen-rich fuel stream; and
        (6) a fuel feed passage for directing said hydrogen-rich fuel stream from said fuel processing subsystem to said anode;
    (B) a furnace vessel;
    (C) a furnace burner comprising a burner head disposed within said furnace vessel for producing a hot burner gas which is circulated within said furnace vessel for providing heat within said furnace vessel;
    (D) a reformer disposed within said furnace vessel for endothermically catalytically converting a fuel stream into a reformate fuel stream, which comprises hydrogen, carbon monoxide, carbon dioxide, and water vapor, said reformer comprising:

(1) a reformer vessel;
(2) a reformer inlet for directing said fuel stream into said reformer vessel;
(3) a catalyst bed contained within said reformer vessel and in thermal contact with an exterior surface of said reformer vessel;
(4) a fluid passage for directing said fuel stream from said reformer inlet to said catalyst bed where said fuel stream is converted into said reformate fuel stream;
(5) a fluid passage for directing said reformate fuel stream to a reformer outlet through which said reformate stream exits said reformer vessel;

(E) an indirect heat exchanger assembly comprising a pipe with a heat exchanging portion disposed within said furnace vessel for heating a fluid directed through the interior of said pipe, wherein said fluid is directed to said heat exchanging portion from outside said furnace vessel and exits said heat exchanging portion and said furnace vessel through an outlet fluid conduit; and (F) burner gas fluid passages within said furnace for fluidly isolating said hot burner gas from said fuel stream, said reformate fuel stream, and said fluid flowing through said heat exchanger assembly, wherein said burner gas fluid passages direct said hot burner gas into thermal contact with exterior surfaces of said reformer vessel and said indirect heat exchanger assembly for transferring heat from said hot burner gas to said catalyst bed and said fuel stream within said reformer vessel, and to said fluid flowing through said indirect heat exchanger assembly.

37. The furnace of claim 36 wherein said burner gas fluid passages direct said hot burner gas to said reformer vessel and then to said indirect heat exchanger assembly.

38. The furnace of claim 36 wherein said fluid that is directed through said heat exchanger assembly is said fuel stream.

39. The furnace of claim 36 wherein said furnace vessel comprises a substantially cylindrical body with substantially hemispherical ends.

40. The furnace of claim 39 wherein said reformer vessel comprises a substantially cylindrical body.

41. The furnace of claim 40 wherein said heat exchanging portion of said indirect heat exchanger assembly comprises a pipe coiled around said reformer vessel body.

42. The furnace of claim 36 wherein said heat exchanging portion of said indirect heat exchanger assembly comprises fins extending from said pipe.

43. The furnace of claim 36 wherein said reformer inlet is located within said furnace vessel and is fluidly connected to a fuel stream humidifier located within said furnace vessel and said fuel stream is fed to said fuel stream humidifier through a fluid conduit located outside said furnace vessel.

44. The furnace of claim 41 wherein said reformer inlet is located within said furnace vessel and is fluidly connected to a fuel stream humidifier which comprises a pipe within said furnace vessel disposed around said cylindrical body of said reformer vessel and said fuel stream is fed to said fuel stream humidifier from outside said furnace vessel through a fluid conduit.

45. The furnace of claim 44 wherein said fuel stream humidifier pipe is helical.

46. The fuel cell electric power generation system of any one of claims 1, 7 and 11 further comprising a cogeneration heat exchanger associated with said temperature control subsystem for transferring thermal energy from said electrical power generation subsystem and directing said thermal energy to a cogeneration system external to said fuel cell electric power generation system.

* * * * *